US008443147B2

(12) United States Patent
Brewer et al.

(10) Patent No.: US 8,443,147 B2
(45) **Date of Patent: *May 14, 2013**

(54) MEMORY INTERLEAVE FOR HETEROGENEOUS COMPUTING

(75) Inventors: Tony M. Brewer, Plano, TX (US); Terrell Magee, Carrollton, TX (US); J. Michael Andrewartha, Plano, TX (US)

(73) Assignee: Convey Computer, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,378

(22) Filed: Dec. 5, 2011

(65) Prior Publication Data

US 2012/0079177 A1 Mar. 29, 2012

Related U.S. Application Data

(63) Continuation of application No. 12/186,344, filed on Aug. 5, 2008, now Pat. No. 8,095,735.

(51) Int. Cl.
*G06F 12/00* (2006.01)
*G06F 13/00* (2006.01)

(52) U.S. Cl.
USPC ............ 711/127; 711/100; 711/154; 711/157

(58) Field of Classification Search .................. 711/127, 711/100, 118, 154, 157
See application file for complete search history.

(56) References Cited

U.S. PATENT DOCUMENTS 3,434,114 A 3/1969 Arulpragasam et al.
4,128,880 A 12/1978 Cray, Jr.
4,386,399 A 5/1983 Rasala et al.
4,685,076 A 8/1987 Yoshida et al.
4,817,140 A 3/1989 Chandra et al.
4,897,783 A 1/1990 Nay
5,027,272 A 6/1991 Samuels (Continued)

FOREIGN PATENT DOCUMENTS

EP 0 945 788 9/1999
EP 1 306 751 5/2003
WO WO-2008/014494 1/2008

OTHER PUBLICATIONS

B. Ramakrishna Rau, Pseudo-Randomly Interleaved Memory, 1991, pp. 74-83.*

(Continued)

*Primary Examiner* — Tuan V. Thai
(74) *Attorney, Agent, or Firm* — Fulbright & Jaworski L.L.P.

(57) ABSTRACT

A memory interleave system for providing memory interleave for a heterogeneous computing system is provided. The memory interleave system effectively interleaves memory that is accessed by heterogeneous compute elements in different ways, such as via cache-block accesses by certain compute elements and via non-cache-block accesses by certain other compute elements. The heterogeneous computing system may comprise one or more cache-block oriented compute elements and one or more non-cache-block oriented compute elements that share access to a common main memory. The cache-block oriented compute elements access the memory via cache-block accesses (e.g., 64 bytes, per access), while the non-cache-block oriented compute elements access memory via sub-cache-block accesses (e.g., 8 bytes, per access). A memory interleave system is provided to optimize the interleaving across the system's memory banks to minimize hot spots resulting from the cache-block oriented and non-cache-block oriented accesses of the heterogeneous computing system.

28 Claims, 5 Drawing Sheets

U.S. PATENT DOCUMENTS 5,109,499 A 4/1992 Inagami et al.
5,117,487 A 5/1992 Nagata
5,202,969 A 4/1993 Sato et al.
5,222,224 A 6/1993 Flynn et al.
5,283,886 A 2/1994 Nishii et al.
5,479,624 A * 12/1995 Lee .................................. 711/1
5,513,366 A 4/1996 Agarwal et al.
5,598,546 A 1/1997 Blomgren
5,664,136 A 9/1997 Witt et al.
5,752,035 A 5/1998 Trimberger
5,838,984 A 11/1998 Nguyen et al.
5,887,182 A 3/1999 Kinoshita et al.
5,887,183 A 3/1999 Agarwal et al.
5,920,721 A 7/1999 Hunter et al.
5,935,204 A 8/1999 Shimizu et al.
5,937,192 A 8/1999 Martin
5,999,734 A 12/1999 Willis et al.
6,006,319 A 12/1999 Takahashi et al.
6,023,755 A 2/2000 Casselman
6,075,546 A 6/2000 Hussain et al.
6,076,139 A 6/2000 Welker et al.
6,076,152 A 6/2000 Huppenthal et al.
6,097,402 A 8/2000 Case et al.
6,125,421 A 9/2000 Roy
6,154,419 A 11/2000 Shakkarwar
6,156,307 A 12/2000 Granucci
6,170,001 B1 1/2001 Hinds et al.
6,175,915 B1 1/2001 Cashman et al.
6,195,676 B1 2/2001 Spix et al.
6,202,133 B1 3/2001 Jeddeloh
6,209,067 B1 3/2001 Collins et al.
6,240,508 B1 5/2001 Brown, III et al.
6,308,255 B1 10/2001 Gorishek, IV et al.
6,342,892 B1 1/2002 Van Hook et al.
6,434,687 B1 8/2002 Huppenthal
6,473,831 B1 10/2002 Schade
6,480,952 B2 11/2002 Gorishek, IV et al.
6,611,908 B2 8/2003 Lentz et al.
6,665,790 B1 12/2003 Glossner, III et al.
6,684,305 B1 1/2004 Deneau
6,738,967 B1 5/2004 Radigan
6,789,167 B2 9/2004 Naffziger
6,831,979 B2 12/2004 Callum
6,868,472 B1 3/2005 Miyake et al.
6,891,543 B2 5/2005 Wyatt
6,954,845 B2 10/2005 Arnold et al.
6,983,456 B2 1/2006 Poznanovic et al.
7,000,211 B2 2/2006 Arnold
7,065,631 B2 6/2006 Weaver
7,120,755 B2 10/2006 Jamil et al.
7,149,867 B2 12/2006 Poznanovic et al.
7,167,971 B2 1/2007 Asaad et al.
7,225,324 B2 5/2007 Huppenthal et al.
7,257,757 B2 8/2007 Chun et al.
7,278,122 B2 10/2007 Willis
7,328,195 B2 2/2008 Willis
7,367,021 B2 4/2008 Ansari et al.
7,376,812 B1 5/2008 Sanghavi et al.
7,421,565 B1 9/2008 Kohn
7,546,441 B1 6/2009 Ansari et al.
7,577,822 B2 8/2009 Vorbach
7,643,353 B1 1/2010 Srinivasan et al.
8,122,229 B2 2/2012 Wallach et al.
2001/0011342 A1 8/2001 Pechanek et al.
2001/0049816 A1 12/2001 Rupp
2002/0046324 A1 4/2002 Barroso et al.
2003/0005424 A1 1/2003 Ansari et al.
2003/0140222 A1 7/2003 Ohmi et al.
2003/0221084 A1* 11/2003 Zhou ............................ 711/209
2003/0226018 A1 12/2003 Tardo et al.
2004/0003170 A1 1/2004 Gibson et al.
2004/0088524 A1 5/2004 Chauvel et al.
2004/0107331 A1 6/2004 Baxter
2004/0117599 A1 6/2004 Mittal et al.
2004/0193852 A1 9/2004 Johnson
2004/0194048 A1 9/2004 Arnold
2004/0215898 A1 10/2004 Arimilli et al.
2004/0221127 A1 11/2004 Ang
2004/0236920 A1 11/2004 Sheaffer
2004/0243984 A1 12/2004 Vorbach et al.
2004/0250046 A1 12/2004 Gonzalez et al.
2005/0027970 A1 2/2005 Arnold et al.
2005/0044539 A1 2/2005 Liebenow
2005/0108503 A1 5/2005 Sandon et al.
2005/0172099 A1 8/2005 Lowe
2005/0188368 A1 8/2005 Kinney
2005/0223369 A1 10/2005 Chun et al.
2005/0262278 A1 11/2005 Schmidt
2006/0075060 A1 4/2006 Clark
2006/0259737 A1 11/2006 Sachs et al.
2006/0288191 A1 12/2006 Asaad et al.
2007/0005881 A1 1/2007 Garney
2007/0005932 A1 1/2007 Covelli et al.
2007/0038843 A1 2/2007 Trivedi et al.
2007/0106833 A1 5/2007 Rankin et al.
2007/0130445 A1 6/2007 Lau et al.
2007/0153907 A1 7/2007 Mehta et al.
2007/0157166 A1 7/2007 Stevens
2007/0186210 A1 8/2007 Hussain et al.
2007/0226424 A1 9/2007 Clark et al.
2007/0245097 A1 10/2007 Gschwind et al.
2007/0283336 A1 12/2007 Gschwind et al.
2007/0288701 A1 12/2007 Hofstee et al.
2007/0294666 A1 12/2007 Papakipos et al.
2008/0059758 A1 3/2008 Sachs
2008/0059759 A1 3/2008 Sachs
2008/0059760 A1 3/2008 Sachs
2008/0104365 A1 5/2008 Kohno et al.
2008/0209127 A1 8/2008 Brokenshire et al.
2008/0215854 A1 9/2008 Asaad et al.
2009/0172364 A1 7/2009 Sprangle et al.
2010/0002572 A1 1/2010 Garrett
2010/0138587 A1* 6/2010 Hutson ............................ 711/5
2011/0055516 A1 3/2011 Willis

OTHER PUBLICATIONS

Maurice Hutson, Method and Apparatus of Oddly interleaved Addressing of Pages Memories, Nov 23, 2004, pp. 47-61.*

U.S. Appl. No. 11/841,406, Wallach et al.

U.S. Appl. No. 11/847,169, Wallach et al.

Cray XD1™ FPGA Development, Release 1.2; S-6400-12, issued Apr. 18, 2005. Available at www.eng.uah.edu/~jacksoa/CrayXD1FPGADevelopment.pdf.

Andreas Koch et al., “A Universal Co-Processor for Workstations”, 1994, Abingdon EE&CS Books , 14 pgs.

Arnold, Jeffrey M., “The Splash 2 Processor and Applications”, 1993 IEEE, pp. 482-485.

Belgard, Rich, “Reconfigurable Illogic”, Microprocessor, The Insiders Guide to Microprocessor Hardware, May 10, 2004, 4 pgs.

Callahan et al., “The GARP Architecture and C Compiler”, Computer, vol. 33, No. 4. pp. 62-69, Apr. 2000.

Callahan, Timothy J.; Hauser, John R.; Wawrzynek, John; “The Garp Architecture and C Compiler”, IEEE Computer, vol. 33, No. 4, pp. 62-69, Apr. 2000.

Express Corporation, “XSA Board V1.1, V1.2 User Manual” (Release Date: Jun. 23, 2005).

Express, “XSA-50 Spartan-2 Prototyping Board with 2.5V, 50,000-gate FPGA” (copyright 1998-2008).

FreeBSD, “Manual Reference Pages—A.Out (5)”, Jun. 5, 1993, 6 pgs.

Gerald Estrin, “Organization of Computer Systems—The Fixed Plus Variable Structure Computer”, 1960.

Gokhale, Maya, “Reconfigurable Computing”, Accelerating Computation with Field-Programmable Gate Arrays, © Springer, pp. 4 and 60-64., 2005.

Gokhale, Maya; “Heterogeneous Processing”, Los Alamos Computer Science Institute LACSI 2006, Oct. 17-19, 2006, Santa Fe, NM. Available at www.cct.lsu.edu/~strabd/LACSI2006/workshops/workshop5/gokhale_mccormick.pdf.

Hauck, S. “The Roles of FPGAs in Reprogrammable Systems”, Proceedings fo the IEEE, vol. 86, No. 4, 615-638, Apr. 1998.

International Search Report and Written Opinion issued for PCT/US08/73423 dated Nov. 12, 2008, 12 pgs.

International Search Report and Written Opinion issued for PCT/US08/74566 dated Nov. 14, 2008, 9 pgs.
International Search Report and Written Opinion issued for PCT/US08/75828 dated Nov. 18, 2008, 12 pgs.
International Search Report and Written Opinion issued for PCT/US08/87233, dated Feb. 5, 2009, 11 pgs.
International Search Report and Written Opinion issued for PCT/US09/60811, dated Dec. 1, 2009, 7 pgs.
L.N. Bhuyan, "Lecture 15: Symmetric Multiprocessor: Cache Protocols", Feb. 28, 2001, 16 pgs.
Levine et al., "Efficient Application Representation for HASTE: Hybrid Architectures with a Single, Transformable Executable", 2003, 10 pgs.
Page, I., "Reconfigurable Processor Architectures", Microprocessors and Microsystems, vol. 20, Issue 3 May 1996, pp. 185-196.
Poster entitled GigaScale Mixed-Signal System Verification, FTL Systems, Inc. presented at the DARPA/MTO Team/NeoCAD2003 Fall Review, Sep. 15-17, 2003, Monterey, CA, a public unclassified meeting.
Poster entitled StarStream™ GigaScale Mixed-Signal System Verification, FTL Systems, Inc. presented at the DARPA/MTO Team/NeoCAD Program Review, Feb. 23, 2004, Scottsdale, AZ, Monterey, CA, a public unclassified meeting.
Shirazi et al., "Run-Time Management of Dynamically Reconfigurable Designs", Field-Programmable Logic and Applications from FPGAs to Computing Paradigm, 1998.
Siewiorek, Daniel P.; Bell, Gordon C.; Newell, Allen; "Computer Structures: Principles and Examples" McGraw-Hill, 1982, p. 334, Figure 1(a).
StarStream Design Summary; FTL Systems, Inc., available at Design Automation Conference (DAC), Jun. 13-17, 2005, Anaheim, CA.
The Extended European Search Report issued for EP08827665.4, dated Nov. 5, 2010, 6 pages.
The PC Guide, "The PC's x86 Instruction Set", 2004, www.pcguide.com/ref/cup.arch/int/instX86-c.html, 3 pgs.
Trednnick, Nick et al., "Microprocessor Sunset", Microprocessor, The Insiders Guide to Microprocessor Hardware, May 3, 2004, 4 pgs.
Vassiliadis et al., "The ARISE Reconfigurable Instruction Set Extension Framework", Jul. 16, 2007.

* cited by examiner

MEMORY INTERLEAVE FOR HETEROGENEOUS COMPUTING

CROSS-REFERENCE TO RELATED APPLICATIONS

This application is a Continuation of U.S. patent application Ser. No. 12/186,344 filed Aug. 5, 2008 now U.S. Pat. No. 8,095,735, entitled, "MEMORY INTERLEAVE FOR HETEROGENEOUS COMPUTING," The disclosure of which are hereby incorporated by reference. The present application also relates to the following and commonly-assigned U.S. patent applications: 1) U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET", 2) U.S. patent application Ser. No. 11/854,432 filed Sep. 12, 2007 titled "DISPATCH MECHANISM FOR DISPATCHING INSTRUCTIONS FROM A HOST PROCESSOR TO A CO-PROCESSOR", 3) U.S. patent application Ser. No. 11/847,169 filed Aug. 29, 2007 titled "COMPILER FOR GENERATING AN EXECUTABLE COMPRISING INSTRUCTIONS FOR A PLURALITY OF DIFFERENT INSTRUCTION SETS", 4) U.S. patent application Ser. No. 11/969,792 filed Jan. 4, 2008 titled "MICROPROCESSOR ARCHITECTURE HAVING ALTERNATIVE MEMORY ACCESS PATHS", and 5) U.S. patent application Ser. No. 12/186,372 filed Aug. 5, 2008 titled "MULTIPLE DATA CHANNEL MEMORY MODULE ARCHITECTURE", the disclosures of which are hereby incorporated herein by reference.

TECHNICAL FIELD

The following description relates generally to memory interleaving in multi-processor systems, and more particularly to systems and methods for performing memory interleaving within a heterogeneous multi-processor system.

BACKGROUND

The popularity of computing systems continues to grow and the demand for improved processing architectures thus likewise continues to grow. Ever-increasing desires for improved computing performance/efficiency has led to various improved processor architectures. For example, multi-core processors are becoming more prevalent in the computing industry and are being used in various computing devices, such as servers, personal computers (PCs), laptop computers, personal digital assistants (PDAs), wireless telephones, and so on.

In the past, processors such as CPUs (central processing units) featured a single execution unit to process instructions of a program. More recently, computer systems are being developed with multiple processors in an attempt to improve the computing performance of the system. In some instances, multiple independent processors may be implemented in a system. In other instances, a multi-core architecture may be employed, in which multiple processor cores are amassed on a single integrated silicon die. Each of the multiple processors (e.g., processor cores) can simultaneously execute program instructions. This parallel operation of the multiple processors can improve performance of a variety of applications.

A multi-core CPU combines two or more independent cores into a single package comprised of a single piece silicon integrated circuit (IC), called a die. In some instances, a multi-core CPU may comprise two or more dies packaged together. A dual-core device contains two independent microprocessors and a quad-core device contains four microprocessors. Cores in a multi-core device may share a single coherent cache at the highest on-device cache level (e.g., L2 for the Intel® Core 2) or may have separate caches (e.g. current AMD® dual-core processors). The processors also share the same interconnect to the rest of the system. Each "core" may independently implement optimizations such as superscalar execution, pipelining, and multithreading. A system with N cores is typically most effective when it is presented with N or more threads concurrently.

One processor architecture that has been developed utilizes multiple processors (e.g., multiple cores), which are homogeneous. As discussed hereafter, the processors are homogeneous in that they are all implemented with the same fixed instruction sets (e.g., Intel's x86 instruction set, AMD's Opteron instruction set, etc.). Further, the homogeneous processors access memory in a common way, such as all of the processors being cache-line oriented such that they access a cache block (or "cache line") of memory at a time, as discussed further below.

In general, a processor's instruction set refers to a list of all instructions, and all their variations, that the processor can execute. Such instructions may include, as examples, arithmetic instructions, such as ADD and SUBTRACT; logic instructions, such as AND, OR, and NOT; data instructions, such as MOVE, INPUT, OUTPUT, LOAD, and STORE; and control flow instructions, such as GOTO, if X then GOTO, CALL, and RETURN. Examples of well-known instruction sets include x86 (also known as IA-32), x86-64 (also known as AMD64 and Intel® 64), AMD's Opteron, VAX (Digital Equipment Corporation), IA-64 (Itanium), and PA-RISC (HP Precision Architecture).

Generally, the instruction set architecture is distinguished from the microarchitecture, which is the set of processor design techniques used to implement the instruction set. Computers with different microarchitectures can share a common instruction set. For example, the Intel® Pentium and the AMD® Athlon implement nearly identical versions of the x86 instruction set, but have radically different internal microarchitecture designs. In all these cases the instruction set (e.g., x86) is fixed by the manufacturer and directly hardware implemented, in a semiconductor technology, by the microarchitecture. Consequently, the instruction set is traditionally fixed for the lifetime of this implementation.

FIG. 1 shows a block-diagram representation of an exemplary prior art system 100 in which multiple homogeneous processors (or cores) are implemented. System 100 comprises two subsystems: 1) a main memory (physical memory) subsystem 101 and 2) a processing subsystem 102 (e.g., a multi-core die). System 100 includes a first microprocessor core 104A and a second microprocessor core 104B. In this example, microprocessor cores 104A and 104B are homogeneous in that they are each implemented to have the same, fixed instruction set, such as x86. In addition, each of the homogeneous microprocessor cores 104A and 104B access main memory 101 in a common way, such as via cache block accesses, as discussed hereafter. Further, in this example, cores 104A and 104B are implemented on a common die 102. Main memory 101 is communicatively connected to processing subsystem 102. Main memory 101 comprises a common physical address space that microprocessor cores 104A and 104B can each reference.

As shown further in FIG. 1, a cache 103 is also implemented on die 102. Cores 104A and 104B are each communicatively coupled to cache 103. As is well known, a cache generally is memory for storing a collection of data duplicating original values stored elsewhere (e.g., to main memory 101) or computed earlier, where the original data is expensive to fetch (due to longer access time) or to compute, compared to the cost of reading the cache. In other words, a cache 103 generally provides a temporary storage area where frequently accessed data can be stored for rapid access. Once the data is stored in cache 103, future use can be made by accessing the cached copy rather than re-fetching the original data from main memory 101, so that the average access time is shorter. In many systems, cache access times are approximately 50 times faster than similar accesses to main memory 101. Cache 103, therefore, helps expedite data access that the micro-cores 104A and 104B would otherwise have to fetch from main memory 101.

In many system architectures, each core 104A and 104B will have its own cache also, commonly called the "L1" cache, and cache 103 is commonly referred to as the "L2" cache. Unless expressly stated herein, cache 103 generally refers to any level of cache that may be implemented, and thus may encompass L1, L2, etc. Accordingly, while shown for ease of illustration as a single block that is accessed by both of cores 104A and 104B, cache 103 may include L1 cache that is implemented for each core.

In many system architectures, virtual addresses are utilized. In general, a virtual address is an address identifying a virtual (non-physical) entity. As is well-known in the art, virtual addresses may be utilized for accessing memory. Virtual memory is a mechanism that permits data that is located on a persistent storage medium (e.g., disk) to be referenced as if the data was located in physical memory. Translation tables, maintained by the operating system, are used to determine the location of the reference data (e.g., disk or main memory). Program instructions being executed by a processor may refer to a virtual memory address, which is translated into a physical address. To minimize the performance penalty of address translation, most modern CPUs include an on-chip Memory Management Unit (MMU), and maintain a table of recently used virtual-to-physical translations, called a Translation Look-aside Buffer (TLB). Addresses with entries in the TLB require no additional memory references (and therefore time) to translate. However, the TLB can only maintain a fixed number of mappings between virtual and physical addresses; when the needed translation is not resident in the TLB, action will have to be taken to load it in.

As an example, suppose a program's instruction stream that is being executed by a processor, say processor core 104A of FIG. 1, desires to load data from an address "Foo" into a first general-purpose register, GPR1. Such instruction may appear similar to "LD <Foo>, GRP1". Foo, in this example, is a virtual address that the processor translates to a physical address, such as address "123456". Thus, the actual physical address, which may be formatted according to a global physical memory address format, is used to access cache 103 and/or memory 101.

In operation, each of cores 104A and 104B reference main memory 101 by providing a physical memory address. The physical memory address (of data or "an operand" that is desired to be retrieved) is first inputted to cache 103. If the addressed data is not encached (i.e., not present in cache 103), the same physical address is presented to main memory 101 to retrieve the desired data.

In contemporary architectures, the processor cores 104A and 104B are cache-line (or "cache-block") oriented, wherein a "cache block" is fetched from main memory 101 and loaded into cache 103. The terms cache line and cache block are used interchangeably herein. Rather than retrieving only the addressed data from main memory 101 for storage to cache 103, such cache-block oriented processors may retrieve a larger block of data for storage to cache 103. A cache block typically comprises a fixed-size amount of data that is independent of the actual size of the requested data. For example, in most implementations a cache block comprises 64 bytes of data that is fetched from main memory 101 and loaded into cache 103 independent of the actual size of the operand referenced by the requesting micro-core 104A/104B. Furthermore, the physical address of the cache block referenced and loaded is a block address. This means that all the cache block data is in sequentially contiguous physical memory. Table 1 below shows an example of a cache block.

TABLE 1

| Physical Address | Operand |
|---|---|
| XXX(7) | Operand 7 |
| XXX(6) | Operand 6 |
| . . . | . . . |
| XXX(1) | Operand 1 |
| XXX(0) | Operand 0 |

In the above example of table 1, the "XXX" portion of the physical address is intended to refer generically to the corresponding identifier (e.g., numbers and/or letters) for identifying a given physical address. For instance, XXX(0) corresponds to the physical address for an Operand 0, while XXX (1) corresponds to the physical address for an Operand 1, and so on. In the example of table 1, in response to a micro-core 104A/104B requesting Operand 0 via its corresponding physical address XXX(0), a 64-byte block of data may be fetched from main memory 101 and loaded into cache 103, wherein such cache block of data includes not only Operand 0 but also Operands 1-7. Thus, depending on the fixed size of the cache block employed on a given system, whenever a core 104A/104B references one operand (e.g., a simple load), the memory system will bring in 4 to 8 to 16 (or more) operands into cache 103.

There are both advantages and disadvantages of this traditional cache-block oriented approach to memory access. One advantage is that if there is temporal (over time) and spatial (data locality) references to operands (e.g., operands 0-7 in the example of Table 1), then cache 103 reduces the memory access time. Typically, cache access times (and data bandwidth) are 50 times faster than similar access to main memory 101. For many applications, this is the memory access pattern.

However, if the memory access pattern of an application is not sequential and/or does not re-use data, inefficiencies arise which result in decreased performance. Consider the following FORTRAN loop that may be executed for a given application:

```
DO I=1, N, 4
    A(i) = B(i) + C(i)
END DO
```

In this loop, every fourth element is used. If a cache block maintains 8 operands, then only 2 of the 8 operands are used. Thus, 6/8 of the data loaded into cache 103 and 6/8 of the memory bandwidth is "wasted" in this example.

In some architectures, special-purpose processors that are often referred to as "accelerators" are also implemented to perform certain types of operations. For example, a processor executing a program may offload certain types of operations to an accelerator that is configured to perform those types of operations efficiently. Such hardware acceleration employs hardware to perform some function faster than is possible in software running on the normal (general-purpose) CPU. Hardware accelerators are generally designed for computationally intensive software code. Depending upon granularity, hardware acceleration can vary from a small functional unit to a large functional block like motion estimation in MPEG2. Examples of such hardware acceleration include blitting acceleration functionality in graphics processing units (GPUs) and instructions for complex operations in CPUs. Such accelerator processors generally have a fixed instruction set that differs from the instruction set of the general-purpose processor, and the accelerator processor's local memory does not maintain cache coherency with the general-purpose processor.

A graphics processing unit (GPU) is a well-known example of an accelerator. A GPU is a dedicated graphics rendering device commonly implemented for a personal computer, workstation, or game console. Modern GPUs are very efficient at manipulating and displaying computer graphics, and their highly parallel structure makes them more effective than typical CPUs for a range of complex algorithms. A GPU implements a number of graphics primitive operations in a way that makes running them much faster than drawing directly to the screen with the host CPU. The most common operations for early two-dimensional (2D) computer graphics include the BitBLT operation (combines several bitmap patterns using a RasterOp), usually in special hardware called a "blitter", and operations for drawing rectangles, triangles, circles, and arcs. Modern GPUs also have support for three-dimensional (3D) computer graphics, and typically include digital video-related functions.

Thus, for instance, graphics operations of a program being executed by host processors 104A and 104B may be passed to a GPU. While the homogeneous host processors 104A and 104B maintain cache coherency with each other, as discussed above with FIG. 1, they do not maintain cache coherency with accelerator hardware of the GPU. In addition, the GPU accelerator does not share the same physical or virtual address space of processors 104A and 104B.

In multi-processor systems, such as exemplary system 100 of FIG. 1, main memory 101 can be configured to improve performance. One approach for managing memory in a desirable way is known in the art as memory interleaving. In general, memory interleaving schemes attempt to distribute memory accesses evenly across the memory so as to mitigate or avoid hot spots within the memory.

As an example, one approach to memory interleaving is to spread the main memory 101 across different memory controllers. An interleave scheme may be employed to distribute the memory substantially evenly across the available memory controllers. As memory is more evenly distributed, large contiguous arrays of data touch each of the memory controllers substantially the same amount. Therefore, by interleaving memory, the memory is more evenly distributed so as to mitigate or avoid hot spots. Hot spots can occur, for example, if a given memory controller is overloaded due to large, unevenly distributed amounts of contiguous data being locally associated with the given memory controller. Various interleaving schemes for use with homogeneous processors, such as cores 104A and 104B of FIG. 1, are well known in the art.

In most systems, memory 101 may hold both programs and data. Each has unique characteristics pertinent to memory performance. For example, when a program is being executed, memory traffic is typically characterized as a series of sequential reads. On the other hand, when a data structure is being accessed, memory traffic is usually characterized by a stride, i.e., the difference in address from a previous access. A stride may be random or fixed. For example, repeatedly accessing a data element in an array may result in a fixed stride of two. As is well-known in the art, a lot of algorithms have a power of 2 stride. Accordingly, without some memory interleave management scheme being employed, hot spots may be encountered within the memory in which a common portion of memory (e.g., a given bank of memory) is accessed much more often than other portions of memory.

As is well-known in the art, memory is often arranged into independently controllable arrays, often referred to as "memory banks." Under the control of a memory controller, a bank can generally operate on one transaction at a time. The memory may be implemented by dynamic storage technology (such as "DRAMS"), or of static RAM technology. In a typical DRAM chip, some number (e.g., 4, 8, and possibly 16) of banks of memory may be present. A memory interleaving scheme may be desired to minimize one of the banks of memory from being a "hot spot" of the memory.

As discussed above, many compute devices, such as the Intel x86 or AMD x86 microprocessors, are cache-block oriented. Today, a cache block of 64 bytes in size is typical, but compute devices may be implemented with other cache block sizes. A cache block is typically contained all on a single hardware memory storage element, such as a single dual in-line memory module (DIMM). As discussed above, when the cache-block oriented compute device accesses that DIMM, it presents one address and is returned the entire cache-block (e.g., 64 bytes).

Some compute devices, such as certain accelerator compute devices, may not be cache-block oriented. That is, those non-cache-block oriented compute devices may access portions of memory (e.g., words) on a much smaller, finer granularity than is accessed by the cache-block oriented compute devices. For instance, while a typical cache-block oriented compute device may access a cache block of 64 bytes for a single memory access request, a non-cache-block oriented compute device may access a Word that is 8 bytes in size in a single memory access request. That is, the non-cache-block oriented compute device in this example may access a particular memory DIMM and only obtain 8 bytes from a particular address present in that DIMM.

As discussed above, traditional multi-processor systems have employed homogeneous compute devices (e.g., processor cores 104A and 104B of FIG. 1) that each access memory 101 in a common manner, such as via cache-block oriented accesses. While some systems may further include certain heterogeneous compute elements, such as accelerators (e.g., a GPU), the heterogeneous compute element does not share the same physical or virtual address space of the homogeneous compute elements. Accordingly, traditional memory interleave schemes have not attempted to address an interleave of memory accesses across heterogeneous compute elements, which may access memory in different ways, such as via cache-block and non-cache-block accesses.

SUMMARY

More recently, some systems are being developed that include heterogeneous compute elements that share a common physical and/or virtual address space of memory. As an example, a system may comprise one or more compute elements that are cache-block oriented, and the system may further comprise one or more compute elements that are non-cache-block oriented. For instance, the cache-block oriented compute element(s) may access main memory in cache blocks of, say, 64 bytes per request, whereas the non-cache-block oriented compute element(s) may access main memory via smaller-sized requests (which may be referred to as "sub-cache-block" requests), such as 8 bytes per request.

Accordingly, a desire has arisen for an effective memory interleave scheme for use in such heterogeneous compute systems. Preferably, such a memory interleave scheme would enable distribution of requests from the heterogeneous compute elements in a manner that avoids or mitigates hot spots within the main memory. For instance, as discussed above, it is generally desirable to employ a memory interleave scheme that distributes memory accesses substantially uniformly across all memory banks of the system's main memory.

When all of the compute elements of a system are cache-block oriented, an interleave scheme may be employed to distribute the cache blocks across the memory banks to minimize hot spots for such a homogeneous computing system. Similarly, when all of the compute elements of a system access memory on a Word basis, or other non-cache-block basis, a memory interleave scheme may be employed to distribute the Words across the system's memory banks in such a homogeneous computing system. Now, when heterogeneous compute elements are present in a system that are accessing a common main memory, such that one compute element is cache-block oriented (and thus accessing the memory via cache block per access) and another compute element is non-cache-block oriented (and thus accessing the memory at a finer granularity than the cache block accesses), it becomes desirable to optimize the interleaving across the system's memory banks to minimize hot spots resulting from the cache-block oriented and non-cache-block oriented accesses of the heterogeneous computing system.

One exemplary heterogeneous computing system that may include one or more cache-block oriented compute elements and one or more non-cache-block oriented compute elements is that disclosed in co-pending U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET", the disclosure of which is incorporated herein by reference. For instance, in such a heterogeneous computing system, one or more processors may be cache-block oriented, while one or more other processors (e.g., the processor described as comprising a dynamically reconfigurable instruction set) may be non-cache-block oriented, and the heterogeneous processors share access to the common main memory (and share a common physical and virtual address space of the memory).

In view of the above, a desire exists for an improved memory interleave scheme for heterogeneous computing systems that access memory in different ways. Such an improved memory interleave scheme is desired, for example, for use in computing systems that may include one or more cache-block oriented compute elements and one or more non-cache-block oriented compute elements. While the exemplary heterogeneous computing system disclosed in U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET" is one example of a system for which an improved memory interleave scheme may be desired, embodiments of the improved memory interleave scheme described herein are not limited for use with that heterogeneous computing system, but may likewise be applied to various other types of heterogeneous computing systems in which cache-block oriented and non-cache-block oriented compute elements (e.g., processors) share access to a common memory.

Accordingly, the present invention is directed generally to systems and methods which provide memory interleave for heterogeneous compute elements (e.g., heterogeneous processors). Embodiments of the present invention provide a memory interleave system for effectively interleaving memory that is accessed by heterogeneous compute elements in different ways, such as via cache-block accesses by certain compute elements and via non-cache-block accesses by certain other compute elements.

According to one embodiment, systems and methods are provided for memory interleave in a heterogeneous computing system that comprises one or more cache-block oriented compute elements and one or more non-cache-block oriented compute elements that share access to a common main memory. For instance, in certain embodiments, the heterogeneous compute elements share a common physical and virtual address space of the memory. In one embodiment, the cache-block oriented compute elements access the memory via cache-block accesses (thus, accessing a cache block of, say, 64 bytes, per access), while the non-cache-block oriented compute elements access memory via sub-cache-block accesses (thus, accessing data of finer granularity than that of the cache block, such as 8 bytes, per access). A memory interleave system is provided to optimize the interleaving across the system's memory banks to minimize hot spots resulting from the cache-block oriented and non-cache-block oriented accesses of the heterogeneous computing system. In certain embodiments, the heterogeneous compute elements comprise different instruction sets, and one or more of the heterogeneous compute elements may comprise dynamically-reconfigurable instruction sets, such as in the exemplary heterogeneous computing system disclosed in U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET".

According to certain embodiments, systems and methods are provided for memory interleave in a heterogeneous computing system that comprises one or more compute elements that present physical address requests and one or more heterogeneous compute elements that present virtual address requests. That is, in certain embodiments, the memory interleave system is operable to support interleaving for both physical and virtual address requests that it receives. In certain embodiments, the interleaving management is performed using the physical address requests received from certain compute element(s) and using virtual address requests received from other compute element(s), rather than requiring a translation from virtual to physical addresses first be performed for all of the requests for managing the interleaving.

Additionally, as discussed further herein, in certain embodiments the memory interleave system supports interleaving beyond the amount of memory identified by the common page offset portion of the virtual and physical addresses. For instance, the virtual and physical addresses may have a common portion of their addresses that is the same, which is commonly referred to in the art as the page offset portion of the virtual and physical addresses. The page offset portion is typically some number of the lower bits of the virtual and physical address. The remaining upper bits of the virtual address are not the same as that of the physical address, and thus the upper bits of the virtual address (commonly referred to as the "page" portion of the virtual address) must be translated to determine the upper bits ("page" portion) of the physical address.

According to certain embodiments, a software-enforced relationship (such as that commonly referred to as "page coloring") is used for translating the page portion of the virtual address into the corresponding page portion of the resulting physical address. In certain embodiments, knowledge regarding such software-enforced relationship is utilized by the memory interleaving system to enable interleaving beyond the amount of memory identified by the common page offset portion of the virtual and physical addresses. Thus, the memory interleaving system of certain embodiments is operable to use the physical address requests received from certain compute element(s) and use virtual address requests received from other compute element(s) in performing its memory interleave (rather than requiring a translation from virtual to physical addresses first be performed for all of the requests for managing the interleaving), and the memory interleaving system may utilize knowledge of a software-enforced translation relationship to enable such interleaving beyond the amount of memory identified by the common page offset portion of the virtual and physical addresses.

Page coloring is traditionally used in systems to make virtually tagged caches with contiguous virtual pages map nicely and not collide. Certain embodiments of the present invention use page coloring differently (which may be an extension of the traditional use or an alternative usage of page coloring). For instance, as discussed further herein, certain embodiments of the present invention use page coloring to make virtual pages and physical pages map to equivalent memory banks using an interleaving algorithm. In certain embodiments, page coloring is used to make virtual addresses and associated physical addresses access the same memory location independent of whether the interleaving algorithm is performed on a virtual or physical address.

Thus, in certain embodiments, a memory interleave is provided to optimize the interleaving across the system's memory banks to minimize hot spots resulting from the compute element(s) presenting physical address requests and the compute element(s) presenting the virtual address requests in the heterogeneous computing system. In addition, in certain embodiments, the one or more compute elements that present physical address requests are cache-block oriented compute elements, while the one or more compute elements that present virtual address requests are non-cache-block oriented compute elements.

In one embodiment, an interleave scheme is implemented as a two-level hierarchical interleave scheme. In the two-level hierarchical interleave scheme, the first level interleaves across cache-block orientation in the system, while the second level of the interleave, which is dependent on the first level, performs sub-cache-block oriented (e.g., Word oriented) interleaving within the first level interleaving.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
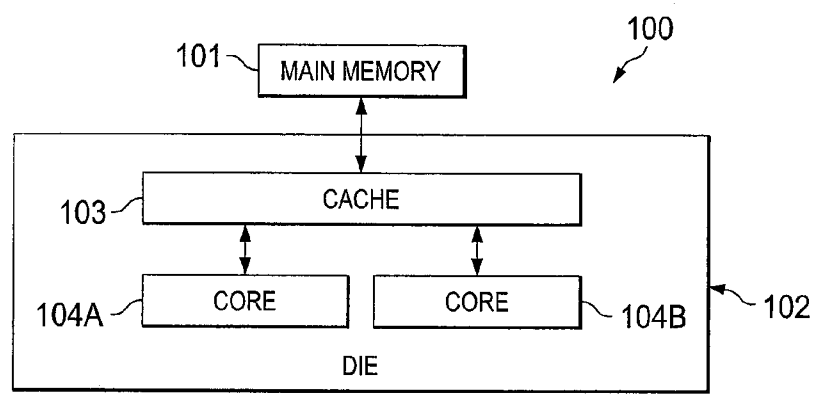
FIG. 1 shows a block diagram of an exemplary system architecture of the prior art.

Embodiments of a memory interleave system for a heterogeneous computing system are now described. First, some exemplary heterogeneous computing systems are briefly described as illustrative examples of systems in which a memory interleave system of embodiments of the present invention may be beneficially employed. Of course, utilization of the memory interleaving concepts described herein is not limited to those illustrative systems, but may likewise be employed within other heterogeneous computing systems. Thereafter, exemplary embodiments of the memory interleave system are described.

Exemplary Heterogeneous Computing Systems

Various types of heterogeneous compute systems may be developed in which the memory interleave scheme of embodiments of the present invention may be employed. As mentioned above, one exemplary heterogeneous computing system that may include one or more cache-block oriented compute elements and one or more non-cache-block oriented compute elements is that disclosed in co-pending U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET", the disclosure of which is incorporated herein by reference. For instance, in such a heterogeneous computing system, one or more processors may be cache-block oriented, while one or more other processors (e.g., the processor described as comprising a dynamically reconfigurable instruction set) may be non-cache-block oriented, and the heterogeneous processors share access to the common main memory (and share a common physical and virtual address space of the memory).

Another exemplary system in which an embodiment of the memory interleave scheme disclosed herein may be employed is that disclosed in co-pending U.S. patent application Ser. No. 11/969,792 filed Jan. 4, 2008 titled "MICROPROCESSOR ARCHITECTURE HAVING ALTERNATIVE MEMORY ACCESS PATHS" (hereinafter "the '792 application"), the disclosure of which is incorporated herein by reference. In particular, the '792 application discloses an exemplary heterogeneous compute system in which one or more compute elements (e.g., processors) are cache-block oriented and one or more heterogeneous compute elements are sub-cache-block oriented to access data at a finer granularity than the cache block. Such an exemplary heterogeneous compute system is now briefly described further to provide an illustrative example of a heterogeneous system that may beneficially support both cache-block accesses and sub-cache-block accesses, thus giving rise to a desire for a memory interleave scheme for such a heterogeneous compute system. Of course, this exemplary heterogeneous system is described merely for illustrative purposes, and the concepts presented herein for memory interleaving within a heterogeneous computing system are not limited in application to this exemplary heterogeneous system of the '792 application.

The '792 application discloses a system and method which employs two memory access paths: 1) a cache-access path in which cache block data is fetched from main memory for loading to a cache, and 2) a direct-access path in which individually-addressed data is fetched from main memory for directly loading data into processor registers and/or storing data. The memory access techniques may be employed for both loading and storing data. Embodiments of the memory interleave scheme disclosed herein may, for example, be employed for interleaving the memory accesses made via the cache-access path and those made via the direct-access path to mitigate hot spots in the memory.

In such an exemplary heterogeneous system, the system may comprise one or more processor cores that utilize the cache-access path for accessing data. The system may further comprise at least one heterogeneous functional unit that is operable to utilize the direct-access path for accessing data. In certain embodiments, the one or more processor cores, cache, and the at least one heterogeneous functional unit may be included on a common semiconductor die (e.g., as part of an integrated circuit). According to the techniques disclosed in the '792 application, improved system performance may be enabled by selectively employing the cache-access path for certain instructions (e.g., selectively having the processor core(s) process certain instructions) while selectively employing the direct-access path for other instructions (e.g., by offloading those other instructions to the heterogeneous functional unit).

Thus, in certain systems, two memory access paths may be employed for accessing data by two or more processing nodes. A first memory access path (which may be referred to as a "cache-access path" or a "block-oriented access path") is a path in which a cache block of data is fetched from main memory to cache. This cache-access path is similar to the traditional cache-block oriented memory accesses described above (e.g., with FIG. 1), whereby if the desired data is present in cache, it is accessed from the cache and if the desired data is not present in the cache it is fetched from main memory and loaded into the cache. Such fetching may load not only the desired data into cache, but may also load some fixed block of data, commonly referred to as a "cache block" as discussed above (e.g., a 64-byte cache block). A second memory access path (which may be referred to herein as a "direct-access path", "cache-bypass path", "non-cache-block oriented access", or "address-oriented access") may enable the cache to be bypassed to retrieve data directly from main memory. In such a direct access, a block of data of finer granularity than that of the cache block (i.e., a sub-cache block) may be retrieved, rather than retrieving a full cache block of data.

In certain embodiments, the main memory is implemented as non-sequential access main memory that supports random address accesses as opposed to block accesses. That is, upon requesting a given physical address, the main memory may return a corresponding operand (data) that is stored to the given physical address, rather than returning a fixed block of data residing at physical addresses. In other words, rather than returning a fixed block of data (e.g., a 64-byte block of data as described in Table 1 above) independent of the requested physical address, the main memory is implemented such that it is dependent on the requested physical address requested (i.e., is capable of returning only the individual data residing at the requested physical address).

When being accessed directly (via the "direct-access path"), the main memory returns the data residing at a given requested physical address, rather than returning a fixed, cache block of data that is independent (in size) of the requested physical address. Thus, rather than a cache block-oriented access, an address-oriented access may be performed in which data of finer granularity than a cache block may be accessed (e.g., only the data for the requested physical address may be retrieved). Further, in one exemplary embodiment, when being accessed via the cache-access path, the main memory is capable of returning a cache block of data. For instance, the non-sequential access main memory can be used to emulate a block reference when desired for loading to a cache, but also supports individual random address accesses without requiring a block load (e.g., when being accessed via the direct-access path). Thus, the same non-sequential access main memory is utilized (with the same physical memory addresses) for both the direct-access and cache-access paths. According to one embodiment, the non-sequential access main memory is implemented by scatter/gather DIMMs (dual in-line memory modules).

In one embodiment, the above-mentioned memory architecture is implemented in a system that comprises at least one processor and at least one heterogeneous compute element. As an example, a semiconductor die (e.g., die 102 of FIG. 1) may comprise one or more processors, such as micro-cores 104A and 104B of FIG. 1, and the semiconductor die may further comprise a heterogeneous compute element, such as a FPGA or other type of computing device (e.g., other processor, etc.). In certain embodiments a multi-processor system is implemented; for instance, a plurality of micro-cores (e.g., cores 104A and 104B of FIG. 1) may be implemented on the semiconductor die.

The processor(s) may utilize the cache-access path for accessing memory, while the heterogeneous compute element is operable to utilize the direct-access path. Thus, certain instructions being processed for a given application may be off-loaded from the one or more processors to the heterogeneous compute element such that the heterogeneous compute element may take advantage of the cache-bypass path to access memory for processing those off-loaded instructions. For instance, again consider the following FORTRAN loop that may be executed for a given application:

```
DO I=1, N, 4
    A(i) = B(i) + C(i)
END DO
```

In this loop, every fourth element (or physical memory address) is used, loaded or stored. As discussed above, if a cache-access path is utilized in which a cache block of 8 operands is retrieved for each access of main memory, then only 2 of the 8 operands are used, and 6/8 of the data loaded into the cache and 6/8 of the memory bandwidth is "wasted" in this example. As discussed in the '792 application, in certain embodiments, such DO loop operation may be off-loaded to the heterogeneous compute element, which may retrieve the individual data elements desired to be accessed directly from the non-sequential access main memory.

As mentioned above, the cache block memory access approach is beneficial in many instances, such as when the data accesses have temporal and/or spatial locality, but such cache block memory access is inefficient in certain instances, such as in the exemplary DO loop operation above. Accordingly, as disclosed in the '792 application, by selectively employing the cache-access path for certain instructions and employing the direct-access path for other instructions, the overall system performance can be improved. That is, by off-loading certain instructions to a heterogeneous compute element that is operable to bypass cache and access individual data (e.g., random, non-sequential addresses) from main memory, rather than requiring fetching of fixed block size of data from main memory, while permitting the cache block memory access to be utilized by the one or more processors (and thus gain the benefits of the cache for those instructions that have temporal and/or spatial locality), the system performance can be improved.

In certain embodiments, the heterogeneous compute element implemented comprises a different instruction set than the native instruction set of the one or more processors. Further, in certain embodiments, the instruction set of the heterogeneous compute element may be dynamically reconfigurable. As an example, in one implementation three (3) mutually-exclusive instruction sets may be pre-defined, any of which may be dynamically loaded to the heterogeneous compute element. As an illustrative example, a first pre-defined instruction set might be a vector instruction set designed particularly for processing 64-bit floating point operations as are commonly encountered in computer-aided simulations, a second pre-defined instruction set might be designed particularly for processing 32-bit floating point operations as are commonly encountered in signal and image processing applications, and a third pre-defined instruction set might be designed particularly for processing cryptography-related operations. While three illustrative pre-defined instruction sets are described above, it should be recognized that embodiments of the present invention are not limited to the exemplary instruction sets mentioned above. Rather, any number of instruction sets of any type may be pre-defined in a similar manner and may be employed on a given system in addition to or instead of one or more of the above-mentioned pre-defined instruction sets.

Embodiments of Memory Interleave for Heterogeneous Computing Systems

Thus, as discussed above, the '792 application describes one exemplary heterogeneous computing system in which heterogeneous compute elements are accessing memory in different ways. For instance, in such a system one or more processors are cache-block oriented while one or more heterogeneous compute elements are sub-cache-block oriented. Various other types of heterogeneous computing systems may be developed which access memory in different ways.

Thus, an improved memory interleave scheme is desired, for example, for use in computing systems that may include one or more cache-block oriented compute elements and one or more non-cache-block oriented compute elements. While the exemplary heterogeneous computing systems disclosed in co-pending U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET" and co-pending U.S. patent application Ser. No. 11/969,792 filed Jan. 4, 2008 titled "MICROPROCESSOR ARCHITECTURE HAVING ALTERNATIVE MEMORY ACCESS PATHS" provide examples of heterogeneous computing systems for which an improved memory interleave scheme may be desired, embodiments of the improved memory interleave scheme described herein are not limited for use with those exemplary heterogeneous computing systems, but may likewise be applied to various other types of heterogeneous computing systems in which cache-block oriented and non-cache-block oriented compute elements (e.g., processors) share access to a common memory.

Figure 2:
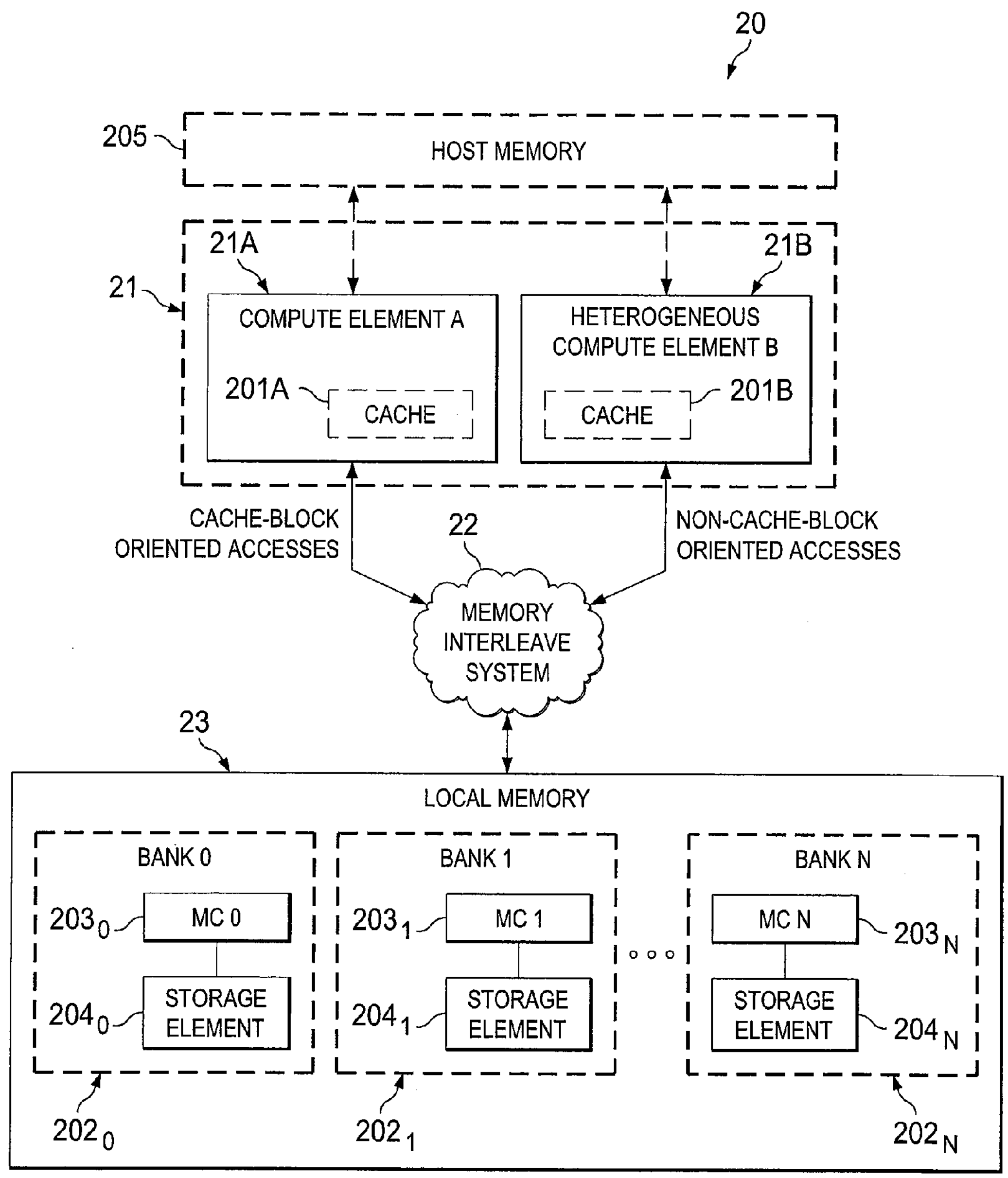
FIG. 2 shows a block diagram of an exemplary system according to one embodiment of the present invention, wherein a memory interleave system receives cache-block memory accesses from one compute element and non-cache-block memory accesses from a heterogeneous compute element.

Turning to FIG. 2, an exemplary system 20 according to one embodiment of the present invention is shown. System 20 comprises three subsystems: 1) processor subsystem 21, 2) memory interleave system 22, and main memory (physical memory) subsystem 23. The combination of subsystems 21 and 23 permit programs to be executed, i.e. instructions are executed in processor subsystem 21 to process data stored in main memory subsystem 23, while memory interleave system 22 promotes a beneficial interleaving of memory 23 (e.g., to reduce hot spots therein). As described further herein, processor subsystem 21 comprises heterogeneous compute elements 21A and 21B. While two compute elements are shown for illustration in FIG. 2, it should be recognized that more than two compute elements may be implemented in other implementations of the system. The compute elements 21A and 21B may be processors (e.g., processor cores) or other functional units, which are heterogeneous in that they access memory 23 in different ways. In addition, the compute elements may comprise different instruction sets in certain embodiments.

As one example, compute element 21A may comprise one or more processor cores) (such as the two homogeneous processor cores 104A and 104B in the example of FIG. 1). Heterogeneous compute element 21B may comprise one or more functional units (e.g., processor cores, FPGA, accelerator, etc.) that are operable to access memory 23 in a different way than does compute element 21A, as discussed further herein. In certain embodiments, compute element 21B comprises a different instruction set than that of compute element 21A, and in certain embodiments the instruction set of compute element 21B may be dynamically reconfigurable, such as disclosed in co-pending U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET." The heterogeneous compute elements 21A and 21B share access to the common main memory 23, and in this embodiment share a common physical and virtual address space of the memory 23.

Processor subsystem 21 may further comprise a cache, such as the cache 201A and 201B. While shown as separate blocks in FIG. 2, in some embodiments, the cache 201A and 201B may be implemented in a manner such as to maintain cache coherency between the heterogeneous compute elements 21A and 21B, such as disclosed in co-pending U.S. patent application Ser. No. 11/854,432 filed Sep. 12, 2007 titled "DISPATCH MECHANISM FOR DISPATCHING INSTRUCTIONS FROM A HOST PROCESSOR TO A CO-PROCESSOR", and as disclosed in co-pending U.S. patent application Ser. No. 11/969,792 filed Jan. 4, 2008 titled "MICROPROCESSOR ARCHITECTURE HAVING ALTERNATIVE MEMORY ACCESS PATHS", the disclosures of which are incorporated herein by reference. For example, cache 201A and 201B may comprise the cache 203 described in connection with FIG. 2 in co-pending U.S. patent application Ser. No. 11/969,792 filed Jan. 4, 2008 titled "MICROPROCESSOR ARCHITECTURE HAVING ALTERNATIVE MEMORY ACCESS PATHS".

In certain embodiments, all elements of processor subsystem 21 are implemented on a common die. In addition, in certain embodiments, all or a portion of memory interleave system 22 may further be included on such common die.

Compute elements 21A and 21B access memory 23 according to different memory access methods. For instance, in the illustrated example of FIG. 2, compute element 21A is cache-block oriented, and thus accesses memory 23 via cache-block accesses, while compute element 21B is non-cache-block oriented, and thus does not access memory 23 via cache-block accesses (but may instead utilize sub-cache-block (e.g., Word) accesses). Thus, if implemented according to the exemplary heterogeneous computing system disclosed in co-pending U.S. patent application Ser. No. 11/969,792 filed Jan. 4, 2008 titled "MICROPROCESSOR ARCHITECTURE HAVING ALTERNATIVE MEMORY ACCESS PATHS" discussed above, compute element 21A may employ a cache-access path for processing certain instructions (and thus access memory 23 via cache-block accesses), while compute element 21B may employ a direct-access path for processing other instructions (and thus access memory 23 via sub-cache-block accesses). As discussed further herein, memory interleave system 22, according to embodiments of the present invention, is operable to manage interleaving across both the cache-block oriented accesses of compute element 21A and the non-cache-block oriented accesses of heterogeneous compute element 21B.

In the illustrated example, memory 23 may comprise a plurality of banks, such as banks $\mathbf{202}_0$-$\mathbf{202}_N$ (wherein N may be any integer number more than 1). Each memory bank may comprise a corresponding memory controller, such as memory controllers $\mathbf{203}_0$-$\mathbf{203}_N$, which control access to the corresponding storage element $\mathbf{204}_0$-$\mathbf{204}_N$ of the bank. The storage elements $\mathbf{204}_0$-$\mathbf{204}_N$ may comprise any data storage structure that is now known or later developed for implementing memory 23. As an example, the storage elements may each comprise one or more DIMMs. In one implementation, each storage element $\mathbf{204}_0$-$\mathbf{204}_N$ comprises a pair of DIMMs, and thus each memory controller $\mathbf{203}_0$-$\mathbf{203}_N$ controls a corresponding pair of DIMMs within a bank. In certain embodiments, scatter/gather DIMMs are implemented, such as those disclosed in commonly-assigned U.S. patent application Ser. No. 12/186,372 filed Aug. 5, 2008 titled "MULTIPLE DATA CHANNEL MEMORY MODULE ARCHITECTURE", the disclosure of which is hereby incorporated herein by reference.

Again, heterogeneous compute elements 21A and 21B share access to the common main memory 23, and in this embodiment share a common physical and virtual address space of the memory 23. As discussed further herein, embodiments of memory interleave system 22 enable memory interleaving for both the cache-block oriented accesses of compute element 21A and the non-cache-block oriented accesses of heterogeneous compute element 21B. As discussed further herein, embodiments of memory interleaving system 22 optimize the interleaving across the system's memory banks $\mathbf{202}_0$-$\mathbf{202}_N$ to minimize hot spots resulting from the cache-block oriented and non-cache-block oriented accesses of the heterogeneous computing system 20.

It should be recognized that while memory interleave system 22 is utilized for interleaving memory 23, other data storage (or "memory") may be present in the system 20 which may not be managed by memory interleave system 22. For instance, other host memory 205 and/or cache 201A and 201B may be implemented in the system 20, which are not managed by memory interleave system 22. In other words, in certain embodiments, additional data storage resources (or "memory") may be included in the system 20, accesses to which are not managed by memory interleave system 22.

Figure 3:
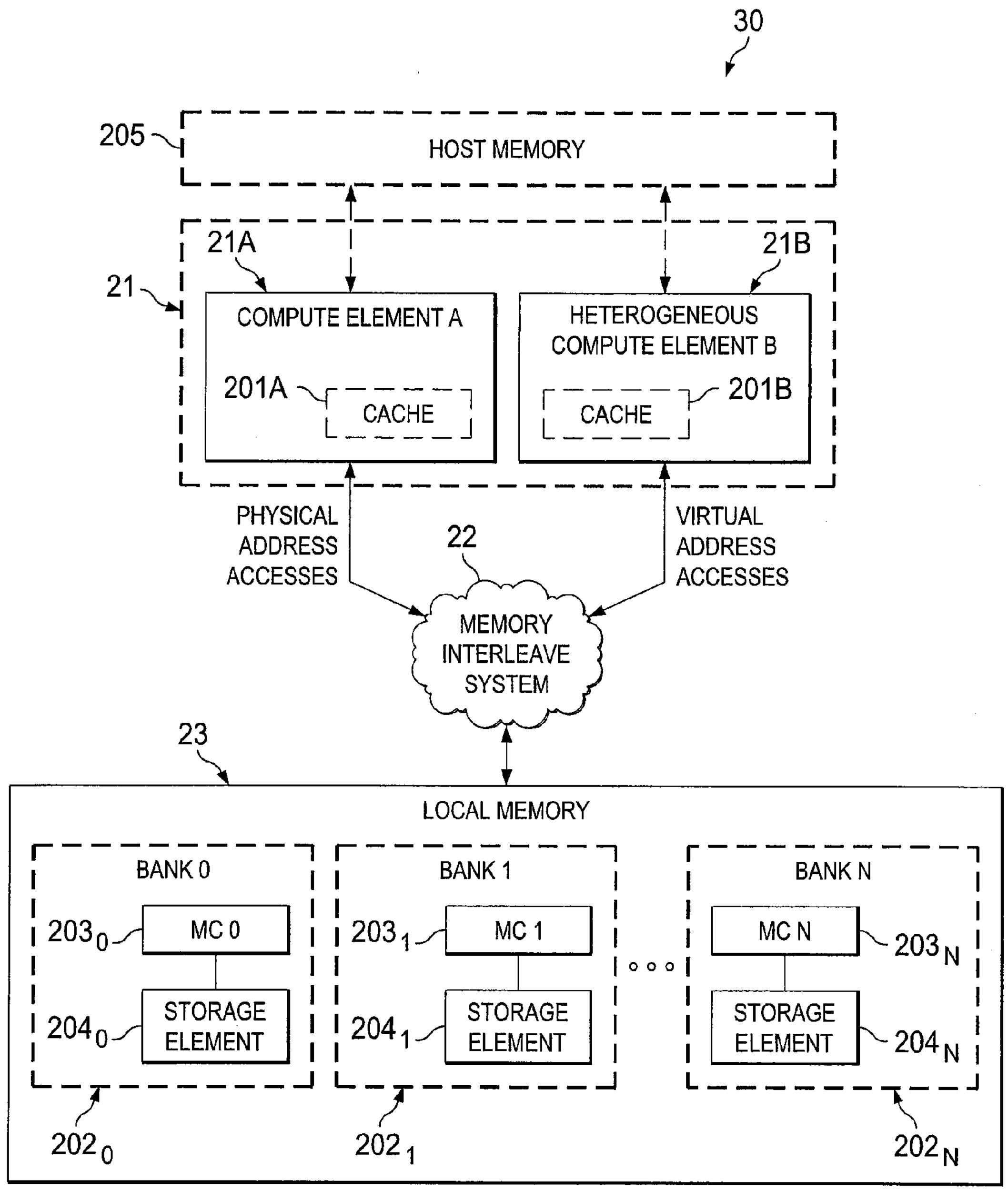
FIG. 3 shows a block diagram of an exemplary system according to another embodiment of the present invention, wherein a memory interleave system receives physical address requests from one compute element and virtual address requests from a heterogeneous compute element.

FIG. 3 shows another exemplary system according to an embodiment of the present invention. This exemplary system 30 is similar to system 20 described above with FIG. 2, and compute elements 21A and 21B again access memory 23 according to different memory access methods. In this example, compute element 21A supplies physical addresses for its memory access requests to memory interleave system 22, while compute element 21B provides virtual addresses for its memory access requests to memory interleave system 22. Thus, in this exemplary embodiment, memory interleave system 22 is operable to support interleaving for both physical and virtual address requests that it receives. Accordingly, the interleaving management is performed using the physical address requests received from compute element 21A and using virtual address requests received from heterogeneous compute element 21B, rather than requiring a translation from virtual to physical addresses first be performed for all of the requests for managing the interleaving. Thus, in this example, the memory access methods differ between compute elements 21A and 21B in that the memory interleave system 22 receives physical address requests from compute element 21A and memory interleave system 22 receives virtual address requests from compute element 21B, and the memory interleave system 22 performs its interleaving using the received physical and virtual address requests, rather than requiring a translation from virtual to physical addresses first be performed for all of the requests for managing the interleaving.

Thus, as discussed above, in certain embodiments (such as the example of FIG. 2) the memory access methods differ between heterogeneous compute elements 21A and 21B with regard to the size of data accessed for each request. For instance, compute element 21A may be cache-block oriented wherein in each memory access it accesses a cache block of, say 64 bytes of data, while compute element 21B may be sub-cache-block oriented wherein in each memory access it accesses a sub cache block of, say 8 bytes of data. In other embodiments (such as the example of FIG. 3) the memory access methods differ between heterogeneous compute elements 21A and 21B with regard to whether physical or virtual addresses are supplied by those computing elements to the memory interleave system 22. For instance, compute element 21A may provide to memory interleave system 22 a physical address for a memory access request, while compute element 21B may provide to memory interleave system 22 a virtual address for a memory access request.

As discussed further below, in certain embodiments, the heterogeneous compute elements differ in both ways. For example, compute element 21A may be cache-block oriented and may provide to memory interleave system 22 a physical address for a cache-block memory access request, while compute element 21B may be sub-cache-block oriented and may provide to memory interleave system 22 a virtual address for a sub-cache-block access request. In all instances, embodiments of the memory interleave system 22 disclosed herein are able to effectively interleave the memory 23 for both heterogeneous compute elements, thereby minimizing the presence of hot spots in the memory 23.

Figure 4:
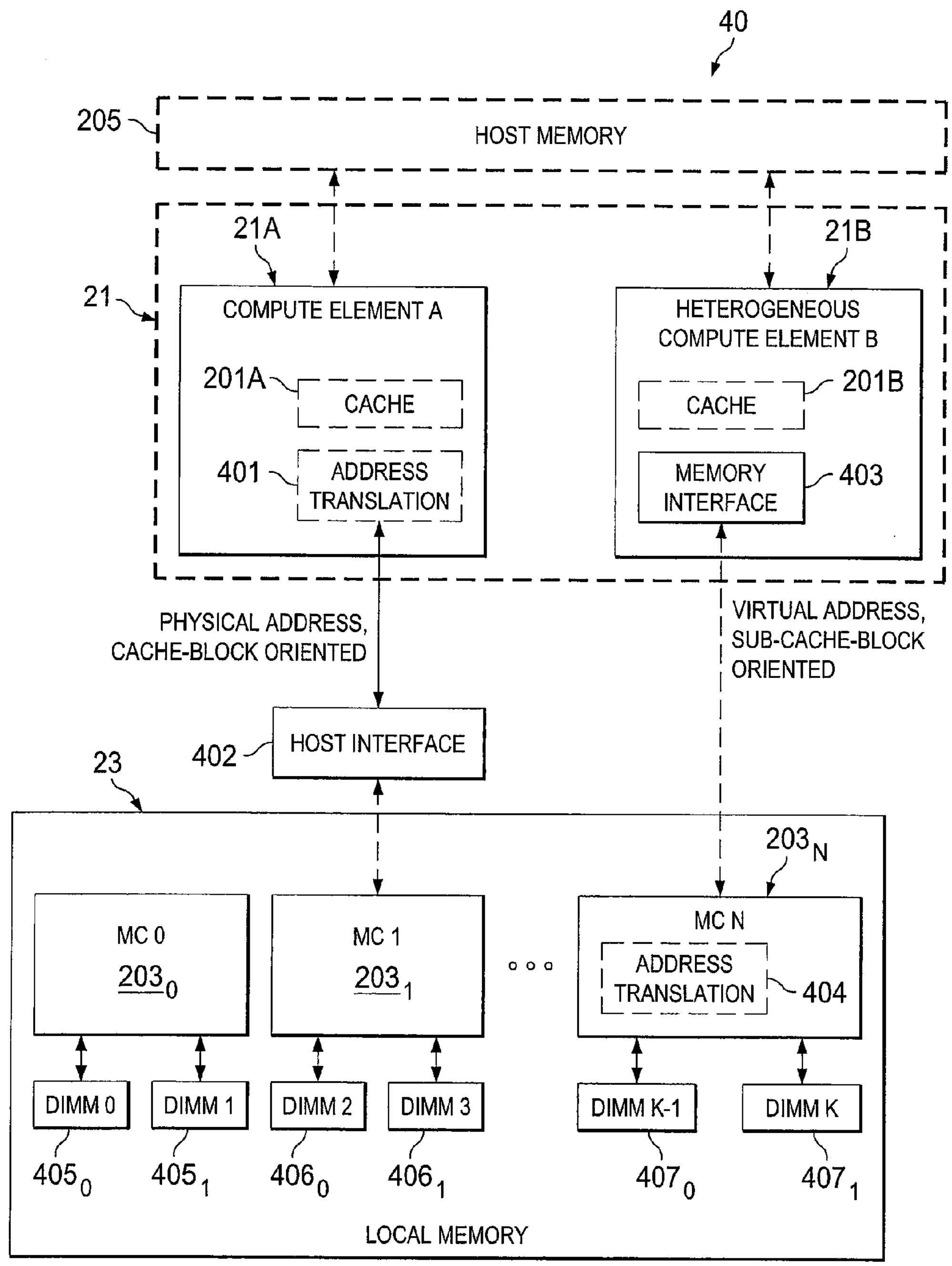
FIG. 4 shows a block diagram of an exemplary system according to yet another embodiment of the present invention, wherein a memory interleave system receives physical address requests for cache-block accesses from one compute element and virtual address requests for sub-cache-block accesses from a heterogeneous compute element.

For instance, FIG. 4 shows an exemplary embodiment of a system 40 according to one embodiment of the present invention. In this example, again a processing subsystem 21 and a memory subsystem 23 are provided. In this exemplary embodiment, compute element 21A is cache-block oriented and issues to the memory interleave system a physical address for a cache-block memory access request, while compute element 21B is sub-cache-block oriented and issues to the memory interleave system a virtual address for a sub-cache-block access request. As discussed hereafter, in this example, the memory interleave system comprises a host interface 402 that receives requests issued by compute element 21A, and the memory interleave system comprises a memory interface 403 that receives requests issued by heterogeneous compute element 21B.

In this exemplary implementation, the storage elements associated with each memory controller $\mathbf{203}_0$-$\mathbf{203}_N$ comprise a pair of DIMMs. For instance, a first pair of DIMMs $\mathbf{405}_0$-$\mathbf{405}_1$ is associated with memory controller $\mathbf{203}_0$, a second pair of DIMMs $\mathbf{406}_0$-$\mathbf{406}_1$ is associated with memory controller $\mathbf{203}_1$, and a third pair of DIMMs $\mathbf{407}_0$-$\mathbf{407}_1$ is associated with memory controller $\mathbf{203}_N$. In one embodiment, there are 8 memory controllers implemented, but a different number may be implemented in other embodiments.

According to this exemplary embodiment, the main memory 23 is implemented as non-sequential access main memory that supports random address accesses as opposed to block accesses. That is, upon requesting a given physical address, the main memory 23 may return a corresponding operand (data) that is stored to the given physical address, rather than returning a fixed, cache block of data residing at physical addresses. In other words, rather than returning a fixed cache block of data (e.g., a 64-byte block of data) independent of the requested physical address, the main memory 23 is implemented such that it is dependent on the requested physical address requested (i.e., is capable of returning only the individual data residing at the requested physical address).

According to certain embodiments, compute element 21A comprises one or more processor cores (e.g., such as cores 104A and 104B of FIG. 1) that are operable to access data in a manner similar to that of traditional processor architectures (e.g., that described above with FIG. 1). That is, the processor core(s) of compute element 21A are operable to access data via a cache-access path, in which a fixed-size block of data (i.e., a cache block) is fetched from main memory 23 (e.g., for loading into the cache 201A), such as described above with exemplary Table 1. In addition, in certain embodiments, compute element 21A is operable to off-load certain instructions for processing by heterogeneous compute element 21B, which is operable to access sub-cache-block of data via a direct-access path.

When being accessed directly (via the "direct-access path"), main memory 23 returns the requested sub-cache-block of data (e.g., data residing at a given requested physical address), rather than returning a fixed cache block of data that is independent (in size) of the requested physical address. Thus, rather than a cache-block oriented access, a sub-cache-block (or address-oriented) access may be performed in which only a sub-cache-block of data (e.g., only the data for the requested physical address) is retrieved. Further, when being accessed via the cache-block access path, main memory 23 is capable of returning a cache block of data. For instance, the non-sequential access main memory 23 can be used to emulate a block reference when desired for loading a cache block of data (e.g., to cache 201A of compute element 21A), but also supports individual random address accesses without requiring a block load (e.g., when being accessed via the sub-cache-block access path of compute element 21B). Thus, the same non-sequential access main memory 23 is utilized (with the same physical memory addresses) for both the cache-block access path (e.g., utilized for data accesses by compute element 21A) and the sub-cache-block access path (e.g., utilized for data access by heterogeneous compute element 21B). According to one embodiment, non-sequential access main memory 23 is implemented by scatter/gather DIMMs (dual in-line memory modules).

Thus, main memory subsystem 23 supports non-sequential memory references, in this exemplary embodiment. According to one embodiment, main memory subsystem 23 further has the following characteristics:

1) Each memory location is individually addressed. There is no built-in notion of a cache block.

2) The entire physical memory is highly interleaved. Interleaving means that each operand resides in its individually controlled memory location.

3) Thus, full memory bandwidth is achieved for a non-sequentially referenced address pattern. For instance, in the above example of the DO loop that accesses every fourth memory address, the full memory bandwidth is achieved for the address reference pattern: $\text{Address}_1$, $\text{Address}_5$, $\text{Address}_9$, and $\text{Address}_{13}$.

4) If the memory reference is derived from a micro-core, then the memory reference pattern is sequential, e.g., physical address reference pattern: $\text{Address}_1$, $\text{Address}_2$, $\text{Address}_3$, $\text{Address}_8$ (assuming a cache block of 8 operands or 8 words).

5) Thus, the memory system can support full bandwidth random physical addresses and can also support full bandwidth sequential addresses.

In the exemplary system 40 of FIG. 4, compute element 21A is cache-block oriented, while compute element 21B is sub-cache-block oriented. Both compute elements 21A and 21B are equally capable of accessing all of the memory controllers $\mathbf{203}_0$-$\mathbf{203}_N$. Further, the compute elements 21A and 21B may be issuing simultaneous or parallel memory access requests for accessing the memory banks in parallel. The host interface 402 and memory interface 403, in this example, perform the memory interleaving to identify which memory controller and actually which DIMM to send a received memory access request to, as discussed further below.

When cache-block oriented compute element 21A issues a memory access request, its request will be sent to a single memory controller requesting a full cache block of data (e.g., 64 bytes of data). The host interface 402 receives an issued request from compute element 21A, and it processes the requested physical address and performs a computation/determination to determine which memory controller $203_0$-$203_N$ of memory 23 to send the request to. As discussed further herein, the techniques for making such determination enable effective memory interleaving to be achieved. The memory controller receives the cache-block access request and accesses the appropriate memory DIMM controlled by such controller to supply the requested cache block of data to compute element 21A (or to store the cache block of data to the DIMM itself). The entire cache block goes to the memory controller because cache coherency is managed at a single memory controller so that there is one point for communication to ensure cache coherency. As in traditional directory-based cache coherency system, the directory is typically located in one place, rather than being distributed across all memory controllers.

In addition, compute element 21A in this exemplary embodiment issues physical address references for its cache block accesses of memory 23. Virtual addresses are used in system 40, and an address translation 401 is performed by compute element 21A to translate a virtual address into a physical address, which compute element 21A uses to access the cache block of data from memory 23. Thus, the physical addresses issued by compute element 21A are received by host interface 402 and used to reference memory controllers $203_0$-$203_N$. In the illustrated example, the physical address is shown as being directed by host interface 402 to memory controller $203_1$, but it may in any instance be directed to any of the memory controllers.

Heterogeneous compute element 21B is sub-cache-block oriented. It issues virtual address memory access requests to memory 23 using sub-cache-block sized accesses, such as 8 byte accesses versus a 64 byte cache block access, as an example. The cache block and sub-cache-block size may be any of various different sizes in a given system implementation, and the concepts disclosed herein may be readily adapted for use in performing memory interleaving in any such system implementation. In general, the cache block and sub-cache block sizes are multiples of each other. For instance, if the sub-cache-block size is 8 bytes, then the cache block size is typically 2, 4, 8, 16 (or some other power of two integer) times the 8 byte sub-cache-block size, thus resulting in a cache block size of 16 bytes, 32 bytes, 64 bytes, 128 bytes, etc.

Memory interface 403, which may be implemented as part of heterogeneous compute element 21B (as shown in FIG. 3) or which may be implemented separately and communicatively coupled to heterogeneous compute element 21B, receives the issued virtual address, determines one of the memory controllers $203_0$-$203_N$, and directs the virtual address request to the determined one of the memory controllers. Such memory interface 403 thus receives a virtual address request from compute element 21B, and it processes the requested virtual address and performs a computation/determination to determine which memory controller $203_0$-$203_N$ of memory 23 to send the request to. As discussed further herein, the techniques for making such determination enable effective memory interleaving to be achieved.

In the illustrated example, the virtual address for a memory access request is shown as being directed to memory controller $203_N$, but it may in any instance be directed to any of the memory controllers. The receiving memory controller performs the address translation from virtual to a physical address for the sub-cache-block request, such as the address translation 404 shown as being performed by memory controller $203_N$ in the illustrated example. Thus, in this exemplary embodiment, the address translation from virtual address to physical address occurs in compute element 21A for the memory accesses by compute element 21A, whereas the address translation from virtual address to physical address occurs in the memory controllers $203_0$-$203_N$ for the memory accesses by compute element 21B.

In general, the computation employed by memory interleave system 22 for determining the interleaving may be one which provides as a high bandwidth as practical for all memory access strides. So, for example, if the cache-block oriented compute element 21A is accessing one cache block out of every 8, then without some memory interleave system in place, the requests would typically be directed to a memory controller $203_0$, then skip 7, go back to controller $203_0$, skip 7, go back to controller $203_0$, and so on, such that the memory bank of controller $203_0$ would become a hot spot. In addition, this results in obtaining a small percentage of the available memory bandwidth. And, as is well-known in the art, encountering these types of strides are typical, and this is why memory interleaving is typically desired in systems.

A desire thus becomes for a memory interleave system that minimizes those hot spots within memory 23 for both the heterogeneous compute elements 21A and 21B. A further desire in this exemplary embodiment of FIG. 4 is to maintain an entire cache block access (e.g., 64 byte cache block access) going to a single memory controller to simplify the cache coherency solution. Thus, to be able to satisfy a single cache block being requested by compute element 21A, it is typically desirable to satisfy such cache block request via a single memory controller $203_0$-$203_N$, rather than having to access multiple memory controllers for returning a single cache block of data being requested.

Another issue present in the exemplary system of FIG. 4 is that compute element 21A provides physical addresses, whereas heterogeneous compute element 21B issues virtual addresses that are translated into physical addresses by the memory controller to which the request was directed (by memory interface 403). In this exemplary system 40, the physical addresses are global in that a given physical address, whether issued by compute element 21A or resulting from a translation by a memory controller of a virtual address issued by compute element 21B, accesses the exact same location in memory 23. So, physical addresses are global across compute elements 21A and 21B such that they access the same location in memory. Yet, for memory access requests from compute element 21A, the host interface 402 utilizes a physical address to determine which memory controller (and ultimately which memory location) to direct the request to in memory 23, whereas for memory access requests from heterogeneous compute element 21B, the memory interface 403 utilizes a virtual address to determine which memory controller to direct the request to in memory 23 (and the receiving memory controller performs the translation from virtual to physical, such as in block 404 of controller $203_N$).

In certain embodiments, the memory interleave system (e.g., comprising host interface 402 and memory interface 403 of FIG. 4) is operable to support interleaving for both physical and virtual address requests that it receives. In certain embodiments, the interleaving management is performed using the physical address requests received from certain compute element(s) (such as the physical address requests received by host interface 402 from compute element 21A) and using virtual address requests received from other compute element(s) (such as the virtual address requests received by memory interface 403 from compute element 21B), rather than requiring a translation from virtual to physical addresses first be performed for all of the requests for managing the interleaving.

Figure 5:
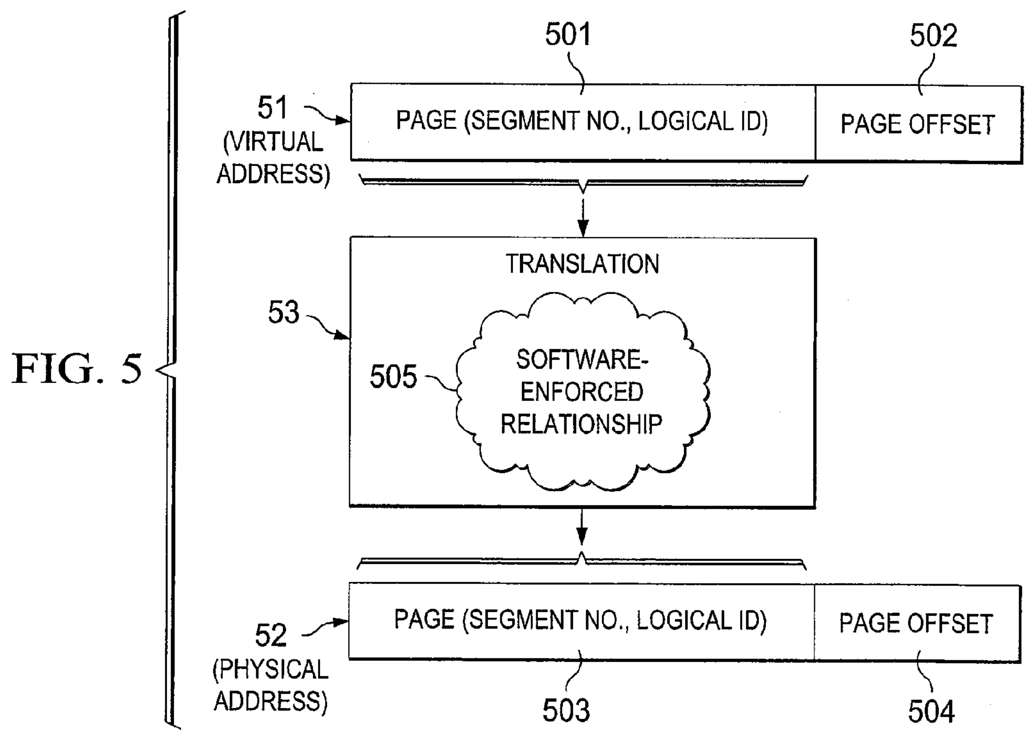
FIG. 5 shows an exemplary translation of virtual addresses to physical addresses that employs a software-enforced relationship, such as in page coloring, wherein knowledge of such relationship is utilized by the memory interleave system according to certain embodiments.

Additionally, as discussed further herein, in certain embodiments the memory interleave system supports interleaving beyond the amount of memory identified by the common page offset portion of the virtual and physical addresses. For instance, turning to FIG. 5, as is well-known in the art, the virtual and physical addresses may have a common portion of their addresses that is the same, which is commonly referred to in the art as the page offset portion of the virtual and physical addresses. For instance, a virtual address 51 may comprise a page offset portion 502, and a translated physical address 52 comprises the same page offset portion 504 of the address. The page offset portion 502, 504 is typically some number of the lower bits of the virtual and physical address. The remaining upper bits of the virtual address 51 are not the same as that of the physical address 52, and thus the upper bits of the virtual address 51 (commonly referred to as the "page" portion 501 of the virtual address) must be translated to determine the upper bits ("page" portion 503) of the physical address 52.

According to certain embodiments, the address translation 53 that is performed (e.g., either in translation 401 of compute element 21A or in translation 404 of memory controller $\mathbf{203}_N$ in the example of FIG. 4) employs a software-enforced relationship 505, such as that commonly referred to as "page coloring". Such software-enforced relationship 505 is used for translating the page portion 501 of the virtual address 51 into the corresponding page portion 503 of the resulting physical address 52. In certain embodiments, knowledge regarding such software-enforced relationship is utilized by the memory interleaving system (e.g., by host interface 402 and memory interface 403) to enable interleaving beyond the amount of memory identified by the common page offset portion 502, 504 of the virtual and physical addresses. Thus, the memory interleaving system of certain embodiments is operable to use the physical address requests received from compute element 21A and use virtual address requests received from heterogeneous compute element 21B in performing its memory interleave (rather than requiring a translation from virtual to physical addresses first be performed for all of the requests for managing the interleaving), and the memory interleaving system (e.g., host interface 402 and memory interface 403) may utilize knowledge of a software-enforced translation relationship 505 to enable such interleaving beyond the amount of memory identified by the common page offset portion 502, 504 of the virtual and physical addresses.

Page coloring is a well-known technique that is traditionally used in systems to make virtually tagged caches with contiguous virtual pages map nicely and not collide. Certain embodiments of the present invention employ page coloring in a different manner than such traditional usage. For instance, as discussed further herein, certain embodiments of the present invention use page coloring to make virtual pages and physical pages map to equivalent memory banks using an interleaving algorithm. In certain embodiments, page coloring is used to make virtual addresses and associated physical addresses access the same memory location independent of whether the memory interleaving system (e.g., the interleaving algorithm employed by the memory interleaving system) is performing its interleaving on a virtual address (such as that supplied by compute element 21B of FIGS. 3-4 above) or a physical address (such as that supplied by compute element 21A of FIGS. 3-4 above).

In one embodiment, an interleave scheme is implemented (e.g., by host interface 402 and memory interface 403) as a two-level hierarchical interleave scheme. In the two-level hierarchical interleave scheme, the first level interleaves across cache-block orientation in the system (e.g., for cache-block requests from compute element 21A), while the second level of the interleave, which is dependent on the first level, performs sub-cache-block oriented (e.g., Word oriented) interleaving within the first level interleaving (e.g., for sub-cache-block requests from compute element 21B). An exemplary implementation of such a two-level hierarchical interleave scheme that is employed in certain embodiments is now described further in connection with an exemplary system. It should be understood that the below-described exemplary implementation is intended to be illustrative of a two-level hierarchical interleave scheme for supporting both cache-block oriented requests and sub-cache-block oriented requests, and the concepts disclosed herein are not limited to this illustrative embodiment. Instead, the concepts may be readily adapted for similar application within other systems for providing memory interleaving among heterogeneous compute elements.

In this illustrative embodiment, the memory system 23 employs scatter/gather DIMMs has 1024 memory banks. The banks are spread across eight memory controllers (i.e., N=8 in the exemplary system 40 of FIG. 4). Each memory controller has two 64-bit busses, and each bus is accessed as eight sub-busses (8-bits per sub bus). Each sub-bus has eight banks. Thus, in this example, the 1024 memory banks is the product of 8 memory controllers*2 DIMMS per memory controller (as shown in FIG. 4)*8 sub-busses per DIMM*8 banks per sub-bus.

In this exemplary implementation, a 31/31 interleave scheme is defined to meet the following desires:

a) Provide as high a bandwidth as possible for all memory access strides, with particular focus on power of two strides;

b) Keep each memory line or "cache block" (64-bytes) on a single memory controller, which is desired to simplify the cache coherency protocol;

c) Maintain the interleave pattern across virtual memory page crossings. This helps large strides where only a few access are to each page; and d) All virtual addresses map to unique physical addresses.

The scheme uses a two-level hierarchical interleave approach. The 1024 banks are divided into 32 groups of 32 banks each. The first interleave level selects one of 31 groups of banks. The second interleave level selects one of 31 banks within a group. Note that of the 32 groups of banks, one is not used. Similarly, one bank within each group of banks is not used. A prime number (31) of banks and groups of banks is used to maximize the sustainable memory bandwidth for as many different strides as possible (at the expense of wasting 6% of memory, and decreasing the peak memory bandwidth by 6%). While a 31/31 interleave scheme is provided in this example, it should be appreciated that this concept can be readily adapted to other interleave schemes, particularly those in which a prime number of banks and groups of banks is used.

First Level Hashing. The first level interleave, according to this exemplary embodiment, selects one of the 31 bank groups using the following hashing function:

Hash1<4:0>=Vaddr<35:6>%31.

The first level interleave function selects which memory controller to send the request. The least significant six bits of the virtual address are ignored since an entire memory line (64 bytes) resides within a single memory controller. The function performs a modulo 31 on the virtual address. The result is a 5-bit value ranging from 0 to 30. The least significant 3 bits of the Hash1 result are used to select which memory controller to issue the memory request. The upper two bits of the Hash1 result are used within the memory controller to select one of four groups of banks.

The Hash1 equation uses the virtual address as the input to the function. The virtual address is used because, as discussed above, the heterogeneous compute element 21B provides the memory interface 403 with virtual addresses, and memory interface 403 must perform the first level hash function to determine which memory controller $\mathbf{203}_0$-$\mathbf{203}_N$ to route each request.

As discussed above with FIG. 4, compute element 21A (which may be referred to as a "host processor") accesses coprocessor memory 23 using physical addresses. In this case, the host interface 403 must be able to select which memory controller $\mathbf{203}_0$-$\mathbf{203}_N$ to route the request using a physical address. The first level hashing function using the physical address in this exemplary embodiment is:

Hash1=(*P*addr<26:22>+*P*addr<21:6>)%31.

The following expression must be satisfied so that the first level hash function will route a virtual address (e.g., from heterogeneous compute element 21B) and a physical address (e.g., from a compute element 21A, such as an X86 processor or I/O, as examples) to the same memory controller. So:

Virtual address hashl = = Physical address hashl
Substituting from above: Vaddr<35:6> % 31 == (Paddr<26:22> + Paddr<21:6>) % 31

When a request is received by the memory controller, the memory controller determines which bank is to be accessed. The memory controller repeats the Hash1 calculation to obtain the upper two bits of the result. One difference, in this exemplary embodiment, is that the memory controller has the physical address for all requests. The memory controller can use the physical address to perform the Hash1 calculation. The upper two bits indicate which of the four groups of banks within the memory controller are to be accessed in this exemplary embodiment.

Page Coloring.

Page coloring is a well-known technique that is traditionally used in systems to make virtually tagged caches with contiguous virtual pages map nicely and not collide. Certain embodiments of the present invention employ page coloring in a different manner than such traditional usage. For instance, as discussed further herein, certain embodiments of the present invention use page coloring to make virtual pages and physical pages map to equivalent memory banks using an interleaving algorithm. Accordingly, certain embodiments of the present invention employ a novel application of the page coloring technique in order to make virtual pages and physical pages map to equivalent memory banks for an interleaving algorithm employed by a memory interleaving system. In certain embodiments, page coloring is used to make virtual addresses and associated physical addresses access a common memory location independent of whether the memory interleaving system (e.g., the interleaving algorithm employed by the memory interleaving system) is performing its interleaving on a virtual address (such as that supplied by compute element 21B of FIGS. 3-4 above) or a physical address (such as that supplied by compute element 21A of FIGS. 3-4 above).

In certain embodiments, the equation discussed above provides a selection criteria that may be used by the operating system to choose a physical page to be mapped to a virtual page. Typically, the operating system (OS) keeps separate pools of physical pages that can be accessed when needed. In this exemplary embodiment, 31 pools of memory pages are maintained.

There are two reasons that page coloring is used for the first level hash in this exemplary embodiment. The first reason is for correctness (i.e. provide a one-to-one mapping between virtual address and physical addresses). As discussed above, the hash function is performed on both the virtual address and the physical address. The second reason is that by using page coloring, the interleave pattern is continued across page crossings.

One question that may arise is what happens when the needed pool is empty. The answer, according to certain embodiments, is that the operating system uses memory paging techniques to "steal" a page that is currently in use. Assigning a page from the wrong pool may result in correctness problems.

Second Level Hashing.

The second level hashing function employed by this exemplary embodiment is performed to determine which bank within a group of banks is the target bank for the request. The second level hashing function in this exemplary embodiment is:

Hash2<4:0>=((((*P*addr<26:22>+*V*addr<21:6>)/31), *V*addr<5:3>)+*P*addr<31:27>)%31.

The Vaddr bits used within the Hash2 function are within the 4M page size, guaranteeing that these bits are the same within the Paddr value. The Paddr<26:22> value modifies how the first level hashing starts within the page to maintain the first level hashing pattern across page boundaries. The Paddr<31:27> value modifies how the second level hashing starts within the page.

According to this exemplary embodiment, the Hash1 and Hash2 results are used by the memory interleave system as follows to select the appropriate bank:

MC = Hashl<2:0>
DIMM = Hashl<3>
Sub Bus = Hash2<2:0>
Bank = Hashl<4>, Hash2<4:3>

The bank address, in this exemplary embodiment, is calculated as:

BankAddr<25:22> = Paddr<35:32>;
BankAddr<21:0> = Paddr<21:0>.

Page coloring is employed across the first level groups in order for the Hash1 function to produce the same result on the physical and virtual addresses. This translation relationship in this exemplary embodiment ensures correctness. The second level hashing is only performed on physical addresses. Because only physical addresses are used for the Hash2 function, correctness is not an issue (i.e., a one-to-one virtual to physical mapping is provided even if second level page coloring is not possible). Page coloring for the second level hashing is employed in this exemplary embodiment to maintain performance for strides that cross pages. The performance dropoff may be significant if page coloring is not used.

A question may arise regarding what happens in this exemplary embodiment when a second level page color is not available. Since there is not a correctness issue for second level hashing, any page color within the appropriate first level hash group can be used, but significant bandwidth degradation may occur.

Regions within an application are rarely aligned on 4 MB page boundaries. Smaller pages are used to span the address range between the start of a memory region and the next 4M page boundary. The physical memory used for smaller pages must be at the equivalent location within a 4M page. This implies that address bits 0-21 of both the virtual and physical addresses must be equivalent whether the page is a full 4 MB, or smaller, in this exemplary embodiment.

In certain embodiments, hardware is implemented within the memory interleave system 22 for performing the above-described Hash1 and Hash2 functions to route each request. The hash functions perform a modulo 31 function in this exemplary embodiment. A "trick" can be used to perform modulo functions. The "trick" is commonly used to decide if a number is divisible by nine. Take the number, add the digits and if the result is divisible by nine then the original number is also divisible by nine. As an example, adding the digits of the number 99 results in the value 18. Taking 18 and again adding the digits ("1" and "8") results in the value 9. This approach can be used for modulo 31 using binary numbers. Of course, any other suitable technique may likewise be employed.

In this exemplary embodiment, the first level hash function using a virtual address is:

```
Hash1 = Vaddr<35:6> % 31.
This equates to:
Tl<7:0> = Vaddr<35:31> + Vaddr<30:26> + Vaddr<25:21> +
Vaddr<20:16> + Vaddr<15:ll> + Vaddr<10:6>;
T2<5:0> = Tl<7:5> + Tl<4:0>
T3<4:0> = T2<5> + T2<4:0>;
Hash1<4:0> = (T3 == 0xlf) ? 0 : T3.
```

In this exemplary embodiment, the first level hash function using a physical address is:

```
Hash1 = (Paddr<26:22> + Paddr<21:6>) % 31.
This equates to:
Tl<7:0> = Paddr<26:22> + Paddr<21> + Paddr<20:16> +
Paddr<15:11> + Paddr<10:6>;
T2<5:0> = Tl<7:5> + Tl<4:0>;
T3<4:0> = T2<5> + T2<4:0>;
Hash1<4:0> = (T3 == 0xlf) ? 0 : T3.
```

In this exemplary embodiment, the Hash1 function comprises a number of add operations.

The second level hash function, in this exemplary embodiment, performs a divide by 31 followed by a modulo 31. The function

```
Hash2<4:0>=((((Paddr<26:22>+Paddr<21:6>)/31),
    Paddr<5:3>)+Paddr<31:27>)%31 equates to:
```

```
S1<16:0> = Paddr<26:22> + Paddr<21:6>;
// Divide by 31
W5<6:0> = S1<16:15> + S1<14:10> + S1<9:5> + Sl<4:0>;
W6<5:0> = W5<6:5> + W5<4:0>;
W7<1:0> = (W6<5:1> == 0xlf) ? 2 : ((W6<5> == 1 || W6 == 0xlf) ?
1 : 0);
B1<14:3> = S1<16:5> + S1<16:10> + S1<16:15> + W5<6:5> +
W7<1:0>;
```

-continued

```
B1<2:0> = Paddr<5:3>;
B2<14:0> = B1<14:0> + Paddr<31:27>;
//Modulo 31
Dl<6:0> = B2<14:10> + B2<9:5> + B2<4:0>;
D2<5:0> = D1<6:5> + D1<4:0>;
D3<4:0> = D2<5> + D2<4:0>;
Hash2<4:0> = (D3 == 0x1f) ? 0 : D3.
```

The Hash2 function, in this example, comprises a number of add operations.

Supporting Address Greater than 36 Bits.

The exemplary hardware algorithms described above assume that addresses are at most 36-bits. Increasing the width of supported addresses requires modifying the above first level hash equation when a virtual address is used. The additional address bits must be added into equation T1 (maintaining the 5-bit segmentation pattern). The width of equation T1 may need to increase to be able to hold the entire the summed value. If T1 increases in width, then equation T2 will also need to be modified to add in the additional T1 bits.

Operating System.

The operating system, in this exemplary embodiment, initializes pools of physical pages to use when applications allocate memory. The following code shows an exemplary algorithm for assigning physical pages to each physical page pool. The pools are organized as a two-dimensional array with the first dimension being indexed by the Hash1 color and the second dimension being accessed by the Hash2 color. The array pool is initialized, in this exemplary embodiment, as follows:

```
// initialize page list
#define PAGE__COLORS (32*32)
#define PAGES__PER__COLOR (TotalMemSize /PAGE__COLORS /
PAGE__SIZE
int pageAddr[31][31] [PAGES__PER__COLOR];
int pageMax[31][31];
int pageCnt[31][31];
for (int color1 = 0; color1 < 31; color1 += 1) {
    for (int color2 = 0; color2 < 31; color2 +=1) {
        pageMax [color1][color2] = 0;
        pageCnt [color1][color2] = 0;
    }
}
for (int ppage = 0; ppage <PAGE__COLORS * PAGES__PER__COLOR;
ppage += 1) {
    if ((ppage & 0x1f) >= 31 || ((ppage >> 5) & 0x1f) >= 31)
        continue;
    int color1 = ppage & 0x1f;
    int color2 = (ppage >> 5) & 0x1f;
    int idx = pageMax[color1][color2];
    pageCnt[color1][color2] += 1;
    pageAddr[color1][color2][idx] = ppage;
    pageMax [color1] [color2] = idx+1;
}
```

The operating system can, in certain embodiments, use the following code to find a page with the appropriate color1/color2 characteristics when a TLB fault occurs:

```
//Page allocation
int color1= ((vaddr & 0xffc00000) >> 6) % 31;
int color2 = ((((((vaddr & 0xffc00000) >> 6) / 31) << 3) % 31 );
if (pageCnt[color1][color2] = = 0) {
    //desired color2 pool is empty,
    // allocate page from a color1 pool with most pages
```

-continued

```
    int highestCnt = 0;
    int highestColor2 = -1;
    for (color2 = 0; color2 < 31; color2 += 1) {
        if (pageCnt[color1][color2] > highestCnt) {
            highestCnt = pageCnt[color1][color2];
            highestColor2 = color2;
        }
    }
        color2 = highestColor2;
        if (color2 == -1) {
            // must use paging mechanism to free up a color1 page
        }
}
//allocate page with color1, color2
pageCnt[color1][color2] -= 1;
```

The above-described interleaving may be performed by logic of a memory interleave system 22, such as logic implemented with a host interface 402 and/or within a memory interface 403. Such logic may, for example, comprise software executable by a functional hardware unit to process the received memory access requests in order to perform the above-described interleaving technique. Various software and/or hardware logic for performing the above-described processing of received memory access requests for interleaving may be readily implemented by those of ordinary skill in the art in accordance with the examples disclosed herein above.

Figure 6:
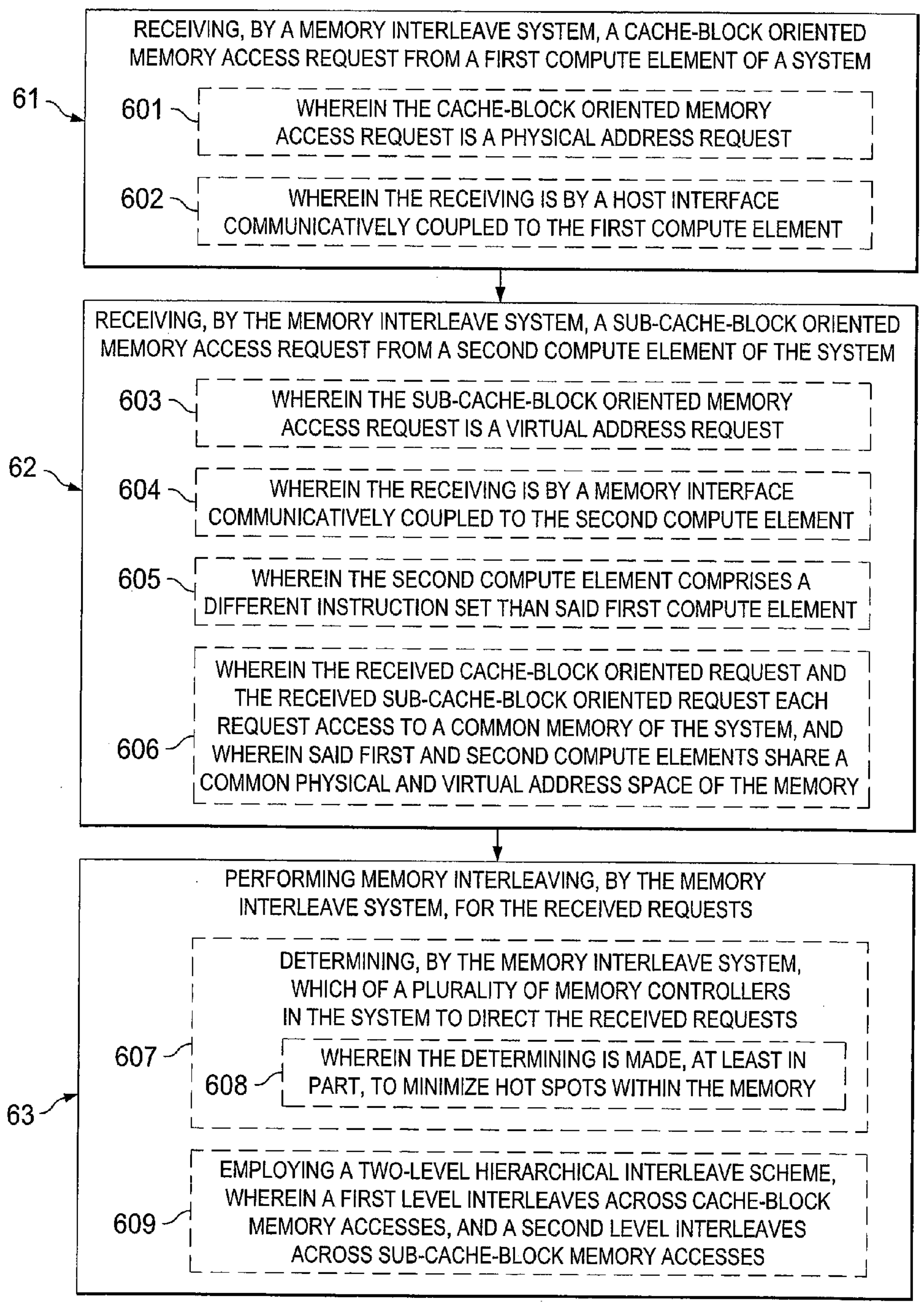
FIG. 6 shows an operational flow diagram for memory interleaving according to one embodiment of the present invention.

Turning to FIG. 6, an operational flow for performing memory interleaving according to one embodiment of the present invention is shown. In operational block 61, a memory interleave system (such as memory interleave system 22 discussed above) receives a cache-block oriented memory access request from a first compute element of a system (e.g., compute element 21A discussed above). As shown in optional sub-block 601, in certain embodiments, the cache-block oriented memory access request is a physical address request. Also, as shown in optional sub-block 602, in certain embodiments a host interface (e.g., host interface 402 of FIG. 4) that is communicatively coupled to the first compute element receives the cache-block oriented memory access request.

In operational block 62, the memory interleave system receives a sub-cache-block oriented memory access request from a second compute element of the system (e.g., compute element 21B discussed above). As shown in optional sub-block 603, in certain embodiments, the sub-cache-block oriented memory access request is a virtual address request. Also, as shown in optional sub-block 604, in certain embodiments a memory interface (e.g., memory interface 403 of FIG. 4) that is communicatively coupled to the second compute element receives the sub-cache-block oriented memory access request.

In certain embodiments, as indicated in optional sub-block 605, the first compute element and the second compute element comprise different instruction sets. For instance, compute element 21A discussed above may be a microprocessor having an X86 instruction set, while compute element 21B discussed above may comprise a different instruction set. As shown in optional sub-block 606, the received cache-block oriented request and the received sub-cache-block oriented request each request access to a common memory of the system (e.g., memory 23 discussed above), and the first and second compute elements share a common physical and virtual address space of the memory.

In operational block 63, the memory interleave system performs memory interleaving for the received cache-block oriented and sub-cache-block oriented memory access requests. For instance, as shown in optional sub-block 607, memory interleave system may determine which of a plurality of memory controllers (e.g., memory controllers 203$_0$-203$_N$ discussed above) to direct the received requests. As indicated in optional sub-block 608, such determining of a memory controller may be made, at least in part, to minimize hot spots within the memory. As shown in optional sub-block 609, in certain embodiments the memory interleave system employs a two-level hierarchical interleave scheme, wherein a first level interleaves across cache-block memory accesses and a second level interleaves across sub-cache-block memory accesses.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing memory interleaving comprising:

performing, in a first level of a two-level interleaving scheme, interleaving across full cache lines of a memory, performing, in a second level of the two-level interleaving scheme, interleaving across sub-cache lines of the memory;

using a prime number of groups of banks for the first level of the two-level interleaving scheme; and using a prime number of banks within each of said groups of banks for the second level of the two-level interleaving scheme;

wherein said memory interleaving is performed for a system comprising a host processor having a fixed instruction set that defines instructions that the host processor can execute; and a reconfigurable co-processor comprising reconfigurable logic that is reconfigurable to have any one of a plurality of predefined extended instruction sets for extending the fixed instruction set of the host processor for processing instructions of an executable file, each of said plurality of predefined extended instruction sets defining a plurality of instructions that the reconfigurable co-processor can execute, wherein said plurality of instructions comprise extended instructions that are not natively defined by the fixed instruction set of the host processor.

2. The method of claim 1 wherein said sub-cache lines comprise words within cache lines.

3. The method of claim 1 further comprising:

using 31 groups of banks for the first level of the two-level interleaving scheme; and using 31 banks within each of said 31 groups of banks for the second level of the two-level interleaving scheme.

4. A system comprising:

a memory;

a plurality of memory controllers for said memory;

a first compute element that issues physical addresses for cache-block oriented access requests to said memory;

a second compute element that issues virtual addresses for sub-cache-block oriented access requests to said memory, wherein said first and second compute elements share a common physical and virtual address space of the memory;

a memory interleave system that receives the physical address for the cache-block oriented access requests issued by the first compute element and receives the virtual addresses for the sub-cache-block oriented access requests issued by the second compute element, and said memory interleave system determines, for each of the received cache-block oriented and sub-cache-block oriented access requests, one of the plurality of memory controllers to direct the access request for interleaving the cache-block oriented and sub-cache-block oriented access requests.

5. The system of claim 4 wherein the first compute element comprises a host processor, and wherein the second compute element comprises a co-processor.

6. The system of claim 5 wherein the host processor comprises a first instruction set, and wherein said co-processor comprises an extended instruction set for extending the instruction set of the host processor.

7. The system of claim 6 wherein the co-processor is reconfigurable to possess any of a plurality of predefined extended instruction sets.

8. The system of claim 7 wherein the co-processor comprises a field-programmable gate array (FPGA).

9. A system comprising:

non-sequential access memory;

a cache-access path in which cache-block data is communicated between said non-sequential access memory and a cache memory; and a direct-access path in which sub-cache-block data is communicated to/from said non-sequential access memory; and a memory interleave system for interleaving accesses to said non-sequential access memory via the cache-access path and the direct-access path to minimize hot spots within said non-sequential access memory;

wherein said memory interleave system receives a physical address for a cache-block memory access request via the cache-access path, and wherein said memory interleave system receives a virtual address for a sub-cache-block memory access request via the direct-access path; and wherein the memory interleave system determines said interleaving using the received physical address for the cache-block memory access request and the received virtual address for the sub-cache-block memory access request without requiring the virtual address to first be translated into a physical address.

10. The system of claim 9 further comprising:

a host processor having a fixed instruction set that defines instructions that the host processor can execute;

a reconfigurable co-processor comprising reconfigurable logic that is reconfigurable to have any one of a plurality of predefined extended instruction sets for extending the fixed instruction set of the host processor for processing instructions of an executable file, each of said plurality of predefined extended instruction sets defining a plurality of instructions that the reconfigurable co-processor can execute, wherein said plurality of instructions comprise extended instructions that are not natively defined by the fixed instruction set of the host processor; and said cache memory.

11. The system of claim 10 wherein in said direct-access path said sub-cache-block data is fetched from said non-sequential access memory to said co-processor.

12. The system of claim 10 wherein in said direct-access path said sub-cache-block data is stored to said non-sequential access memory from said co-processor.

13. The system of claim 10 wherein said host processor accesses cache-block data from said non-sequential access memory via said cache-access path; and wherein said co-processor is operable to access said sub-cache-block data from said non-sequential access memory via said direct-access path.

14. The system of claim 10 wherein said co-processor comprises a field-programmable gate array (FPGA).

15. The system of claim 9 wherein said non-sequential access memory comprises:

a scatter/gather memory module.

16. The system of claim 9 further comprising:

a plurality of memory controllers for said non-sequential access memory, wherein the memory interleave system determines, for each of the accesses to said non-sequential access memory via the cache-access path and the direct-access path, one of the memory controllers to direct the access request to minimize hot spots within said non-sequential access memory.

17. The system of claim 9 wherein said memory interleave system employs a two-level hierarchical interleave scheme for said interleaving, wherein a first level interleaves across cache-block memory accesses received via said cache-access path, and a second level interleaves across sub-cache-block memory accesses received via said direct-access path.

18. A method for performing memory interleaving, said method comprising:

receiving, by a memory interleave system, a cache-block oriented memory access request from a host processor of a system, said host processor having a fixed instruction set that defines instructions that the host processor can execute;

receiving, by the memory interleave system, a sub-cache-block oriented memory access request from a co-processor of the system, said co-processor comprising reconfigurable logic that is reconfigurable to have any one of a plurality of predefined extended instruction sets for extending the fixed instruction set of the host processor for processing instructions of an executable file, each of said plurality of predefined extended instruction sets defining a plurality of instructions that the co-processor can execute, wherein said plurality of instructions comprise extended instructions that are not natively defined by the fixed instruction set of the host processor; and performing memory interleaving, by the memory interleave system, for the received cache-block oriented and sub-cache-block oriented memory access requests.

19. The method of claim 18 wherein the cache-block oriented memory access request is a physical address request, and wherein the sub-cache-block oriented memory access request is a virtual address request.

20. The method of claim 19 further comprising:

translating a virtual address to a physical address for said physical address request for said cache-block oriented memory access request, wherein said translating said virtual address to said physical address for said physical address request for said cache-block oriented memory access request is performed before said performing said memory interleaving.

21. The method of claim 19 wherein said translating comprises:

translating, by said host processor, said virtual address to said physical address prior to sending said cache-block oriented memory access request to said memory interleave system.

22. The method of claim 19 further comprising:

translating said virtual address to a physical address for said sub-cache-block oriented memory access request, wherein said translating of said virtual address to said physical address for said sub-cache-block oriented memory access request is performed after said performing said memory interleaving.

23. The method of claim 22 wherein said translating of said virtual address to said physical address for said sub-cache-block oriented memory access request comprises:

translating, by one of a plurality of memory controllers in the system to which the memory interleave system sends the virtual address for the sub-cache-block oriented memory access request, said virtual address to said physical address for said sub-cache-block oriented memory access request.

24. The method of claim 23 wherein said performing memory interleaving comprises:

determining, by the memory interleave system, which of the plurality of memory controllers in the system to direct the received requests.

25. The method of claim 24 wherein the determining is made, at least in part, to minimize hot spots within the memory.

26. The method of claim 18 wherein said host processor and said co-processor share a common physical and virtual address space of a common memory.

27. The method of claim 26 wherein the received cache-block oriented request and the received sub-cache-block oriented request each request access to the common memory of the system.

28. The method of claim 18 wherein said performing memory interleaving comprises:

employing a two-level hierarchical interleave scheme, wherein a first level interleaves across cache-block memory accesses, and a second level interleaves across sub-cache-block memory accesses.

* * * * *